US008885848B2

(12) United States Patent
Takechi et al.

(10) Patent No.: US 8,885,848 B2
(45) Date of Patent: Nov. 11, 2014

(54) QUALITY EVALUATION METHOD AND QUALITY EVALUATION APPARATUS

(75) Inventors: Yohei Takechi, Osaka (JP); Yutaka Omori, Osaka (JP)

(73) Assignee: Panasonic Corporation, Osaka (JP)

(*) Notice: Subject to any disclaimer, the term of this patent is extended or adjusted under 35 U.S.C. 154(b) by 845 days.

(21) Appl. No.: 13/108,082

(22) Filed: May 16, 2011

(65) Prior Publication Data

US 2011/0282654 A1 Nov. 17, 2011

(30) Foreign Application Priority Data

May 17, 2010 (JP) ................................. 2010-113688

(51) Int. Cl.
*H03B 29/00* (2006.01)
(Continued)

(52) U.S. Cl.
CPC ............... *G10L 25/00* (2013.01); *G06F 1/206* (2013.01); *G01M 13/028* (2013.01);
(Continued)

(58) Field of Classification Search
CPC . G01N 29/043; G01N 29/221; G01N 29/265; G01N 3/08; G01N 33/02; G06K 1/206; G06K 1/3203; G06K 1/3287; B23K 9/095; B23K 11/252; B23K 15/02; G10L 25/00; G10L 15/02; G10L 21/0208; G10L 21/0308; G10L 19/0204; H04N 1/665
USPC .................... 399/91; 381/71.1, 261, 56, 94.1; 348/607, 241; 375/240.27; 73/602, 73/632, 597, 649; 704/200, 1, 270, 275
See application file for complete search history.

(56) References Cited

U.S. PATENT DOCUMENTS 5,299,458 A * 4/1994 Clark et al. ..................... 73/597
(Continued)

FOREIGN PATENT DOCUMENTS

JP 6-66625 3/1994
(Continued)

OTHER PUBLICATIONS

Xianjun Wu, Shijian Zhu : "Voice Quality Research in Household Appliances Design," Household Appliances Science and Technology, pp. 67-69, vol. 5, 2004, along with an English translation of the cited part (2.2-2.3).

*Primary Examiner* — Vijay B Chawan
(74) *Attorney, Agent, or Firm* — Wenderoth, Lind & Ponack, L.L.P.

(57) ABSTRACT

Quality of industrial products is evaluated by evaluating non-stationary operation sound, which is a kind of operation sound, from an aspect of tone, using closely simulated evaluation levels of evaluation of non-stationary sound by used of a human sense of hearing.
An operation sound of a conforming product sample is converted into sound waveform data by a sound collecting unit, and the sound waveform data is input into a computer via an A-D converter, and then converted into psychoacoustic parameters. Data of pseudo conforming products is additionally obtained from the psychoacoustic parameters of a plurality of conforming product samples by making use of deviation in the data of the conforming product samples. Threshold data is obtained using thresholds and masking data for evaluation calculated from psychoacoustic parameters of data of the conforming product samples and the pseudo conforming products by a statistical technique. An operation sound of a subject workpiece is converted into sound waveform data by the sound collecting unit, and the sound waveform data is input into the computer via the A-D converter, and then converted into psychoacoustic parameters. Each of the psychoacoustic parameters is compared with the corresponding one of the previously obtained threshold, and thereby the operation sound is evaluated.

5 Claims, 26 Drawing Sheets

(51) Int. Cl.
   *G10L 25/00*   (2013.01)
   *G06F 1/20*   (2006.01)
   *G01M 13/02*   (2006.01)
   *G01M 13/04*   (2006.01)
   *G10L 15/02*   (2006.01)

(52) U.S. Cl.
   CPC .............. *G01M 13/045* (2013.01); *G10L 15/02* (2013.01)
   USPC ........ 381/94.1; 381/56; 381/71.1; 704/200.1; 704/270

(56) References Cited

U.S. PATENT DOCUMENTS 5,402,495 A * 3/1995 Kim .............................. 381/94.1
   5,408,884 A * 4/1995 Sabourin ........................ 73/649
   5,827,974 A * 10/1998 Nussinovitch et al. ......... 73/821
   7,373,822 B2 * 5/2008 Waschkies et al. ............. 73/597
   8,291,766 B2 * 10/2012 Engl et al. ....................... 73/632
   2002/0090224 A1* 7/2002 Tsunoda ......................... 399/91
   2004/0190928 A1* 9/2004 Tsunoda et al. ................ 399/91
   2009/0092261 A1* 4/2009 Bard ............................. 381/71.1
   2010/0307252 A1* 12/2010 Engl et al. ....................... 73/632

FOREIGN PATENT DOCUMENTS

JP   2001-165766   6/2001
   JP   2006-126141   5/2006
   JP   2008-96305   4/2008
   JP   2010-164506   7/2010

* cited by examiner

QUALITY EVALUATION METHOD AND QUALITY EVALUATION APPARATUS

BACKGROUND OF THE INVENTION (1) Field of the Invention

The present invention relates to a quality evaluation method for industrial products which generate a sound in operation (for example, a motor, a compressor, an inverter, a product incorporating any of them, or a product with a mechanical operation mechanism including a gear, a cam, a slider, or the like).

(2) Description of the Related Art

With few exceptions, all industrial products generate an operation sound when in operation. Such an operation sound is emitted from functional components such as a motor and a compressor, electrical components such as an inverter, or a mechanical operation mechanism including a gear, a cam, or a slider. In a mass production line, such industrial products are evaluated using the operation sound in the middle of or after assembly.

There are the two kinds of operation sounds generated by industrial products: stationary sound and non-stationary sound. For example, some devices such as a motor or a compressor generate an operation sound having a constant sound tone, pitch, and loudness because a coil, a rotor, a vane, or a scroll of the devices rotates at a constant rate. The operation sound generated by such industrial products is called stationary sound. On the other hand, some industrial products generate an operation sound which momentarily changes in tone, pitch, or loudness depending on change in the movement of the industrial products. Such an operation sound is generated by, for example, an optical disc drive loading or unloading a medium, a car navigation system opening or closing a display, or a camera in an electric zooming operation. The operation sound generated by such industrial products is called non-stationary sound. For example, a display of a car navigation system makes no operation sound until an opening operation starts. When the display starts opening, a motor, a gear, and a cam start generating an operation sound. In most cases, an operation sound of opening of a display of a car navigation system changes from the beginning toward the end because engagement of gears or a rotational speed of a motor of changes. It is thus considered difficult to evaluate quality of industrial products based on non-stationary sound in comparison with evaluation based on stationary sound.

Evaluation of quality of industrial products based on an operation sound is usually made through a sensory evaluation using a human sense of hearing. Criteria of the evaluation depend on the sense of evaluator and vary among them. It is thus difficult to quantitatively evaluate quality of industrial products. The criteria of the evaluation may vary even for an evaluator, depending on the evaluator's body condition or environment, so that such evaluation using a sense of human hearing proves to be far from a quantitative evaluation. Thus, there have been attempts to automate evaluation of quality of industrial products based on operation sounds.

In one of conventional methods of automated quality evaluation of industrial products based on operation sound, quality is evaluated with reference to a threshold set for sound pressures of frequencies measured by sound-level meter (for example, see Japanese Unexamined Patent Application Publication No. 2006-126141 (Patent Reference 1)). FIG. 25 illustrates the conventional quality evaluation method for industrial products based on operation sound disclosed in Patent Reference 1.

As shown in FIG. 25, in a conventional method of evaluation of industrial products, an evaluation parameter is set for each frequency band in a frequency space.

However, in the conventional method, thresholds (evaluation parameters in FIG. 25) are set only for the frequency space, so that only stationary sounds generated by industrial products are evaluated. In this case, it is difficult to evaluate quality of industrial products which generate a non-stationary sound, which momentarily changes.

In addition, in the conventional evaluation method, a product is rated as a conforming product as long as a sound generated by the product is at a threshold sound pressure level or lower because quality is evaluated only based on sound pressure levels, which are indices for physical loudness of sound. However, some products should be rated as a defective because of tone of its sound even when the sound pressure level is at a threshold or lower. It is therefore difficult to effectively evaluate quality of industrial products only based on sound pressure levels.

The present invention, conceived to address the problem with conventional techniques, has an object of providing an evaluation method based on sound with a focus on tone.

SUMMARY OF THE INVENTION

In order to achieve the object, the quality evaluation method according to the present invention includes: obtaining operation sound of conforming product samples as conforming-product sound information, the conforming product samples being products of the same kind as a subject workpiece to be evaluated for quality; digitizing the conforming-product sound information of the conforming product samples to obtain conforming-product sound evaluation amounts on a time-series basis, using at least one psychoacoustic parameter; determining, using the conforming-product sound evaluation amounts, an evaluation threshold preset in an apparatus; obtaining operation sound emitted from the subject workpiece as subject sound information; digitizing the subject sound information of the subject workpiece to obtain a subject sound evaluation amount on a time-series basis; and evaluating quality of the subject workpiece based on a result of comparison of the subject sound evaluation amount of the subject workpiece with the determined evaluation threshold.

As described above, the quality evaluation method according to the present invention allows quality evaluation of products by evaluating operation sound from an aspect of tone using closely simulated evaluation levels of evaluation by use of a human sense.

FURTHER INFORMATION ABOUT TECHNICAL BACKGROUND TO THIS APPLICATION

The disclosure of Japanese Patent Application No. 2010-113688 filed on May 17, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE EMBODIMENTS

The following describes embodiments of the present invention with reference to the drawings.

Embodiment 1

Figure 1:
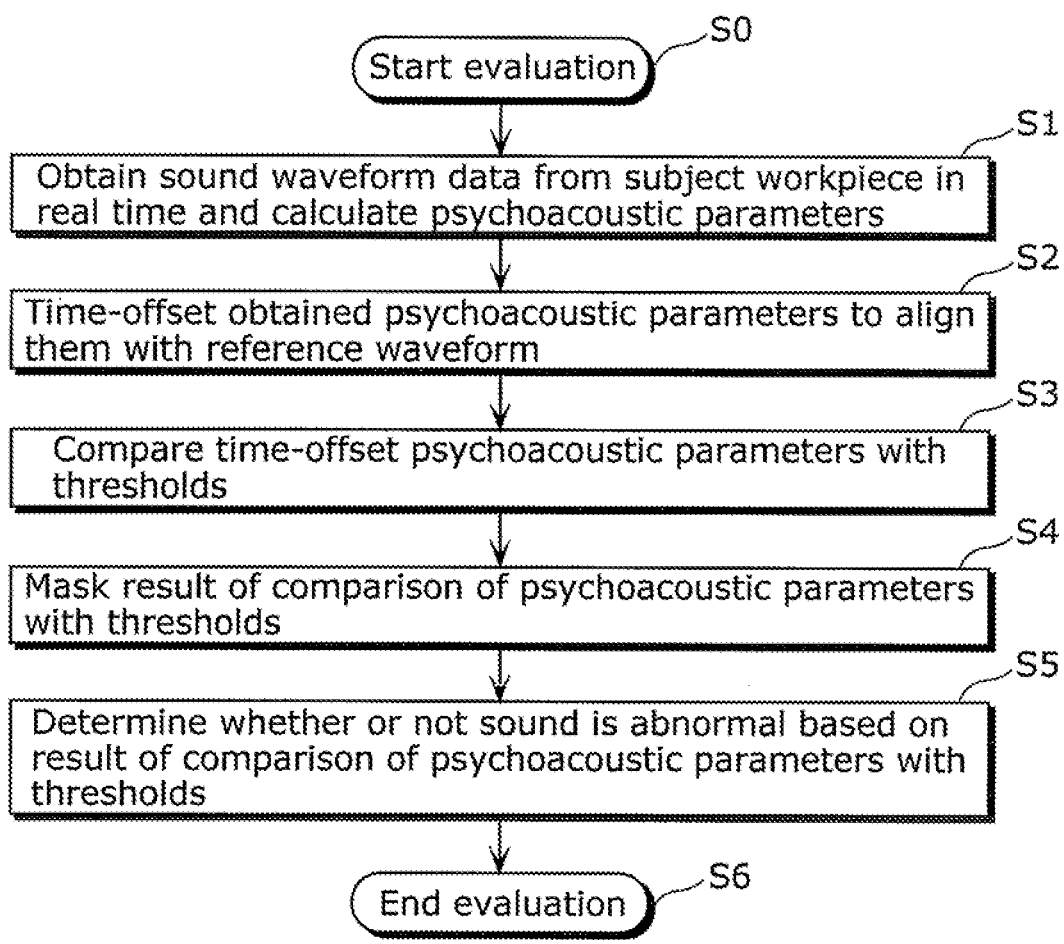
FIG. 1 shows a flowchart illustrating a quality evaluation method based on non-stationary sound according to Embodiment 1 of the present invention.

FIG. 1 shows a flowchart illustrating a process of a quality evaluation method based on non-stationary sound according to Embodiment 1 of the present invention.

Figure 2:
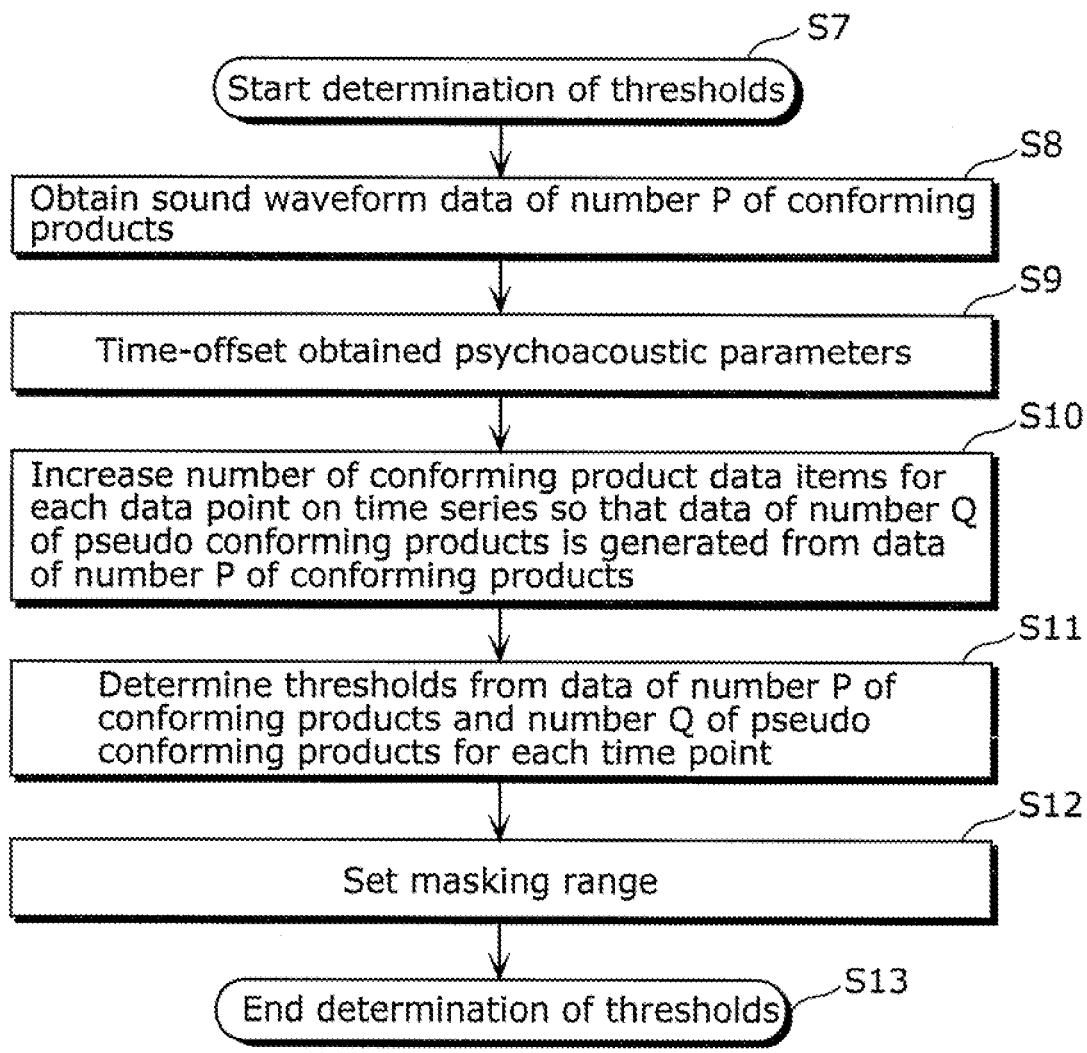
FIG. 2 shows a flowchart illustrating a process of determination of thresholds according to Embodiment 1 of the present invention.

FIG. 2 shows a flowchart illustrating a process of determination of thresholds for use in the quality evaluation method based on non-stationary sound according to Embodiment 1 of the present invention.

Figure 13:
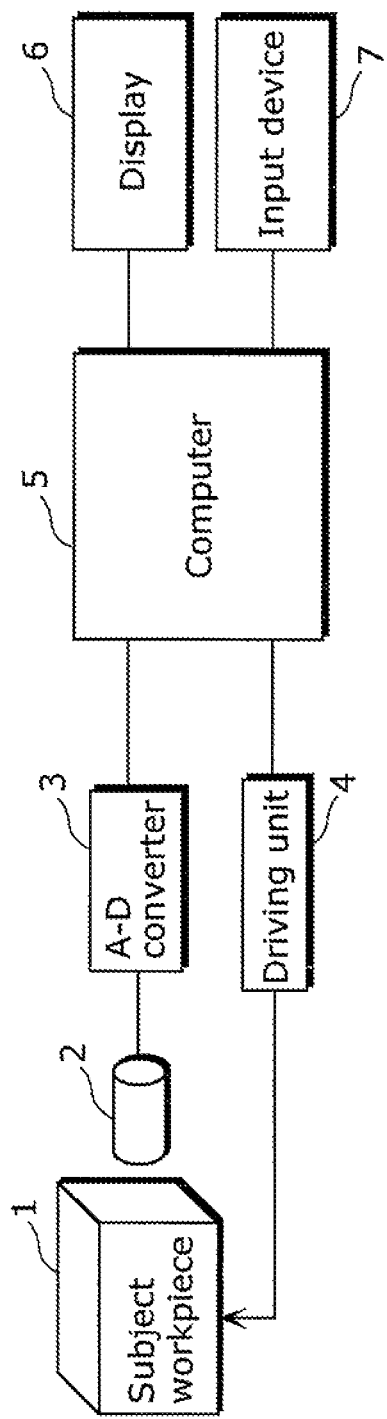
FIG. 13 shows a schematic diagram illustrating an exemplary configuration of an apparatus for quality evaluation based on a non-stationary sound according to Embodiment 1 of the present invention.

FIG. 13 shows a schematic diagram illustrating an exemplary configuration of an apparatus for quality evaluation based on a non-stationary sound according to Embodiment 1 of the present invention.

Figure 17:
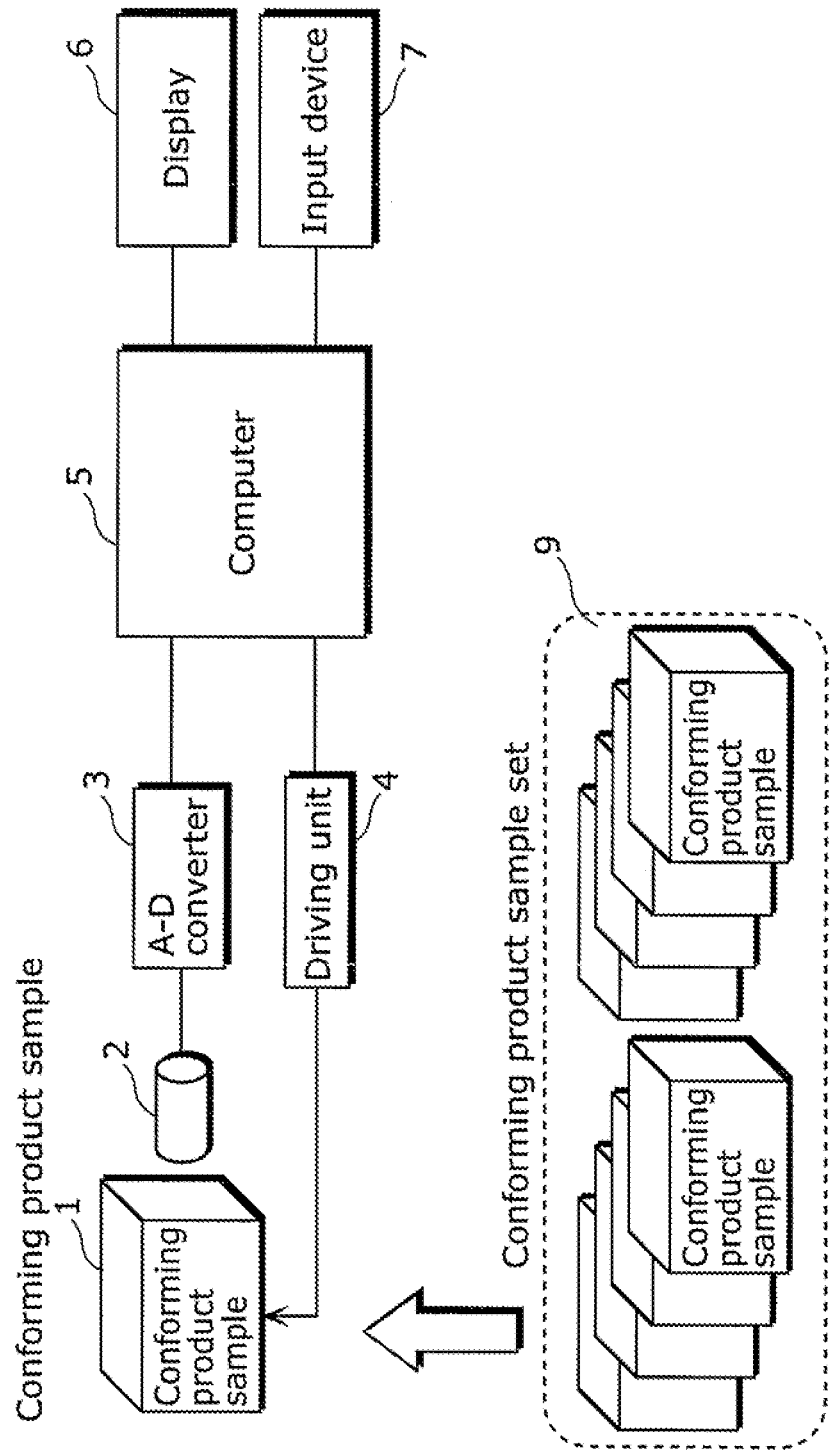
FIG. 17 shows a schematic diagram illustrating an exemplary configuration of an apparatus for determination of thresholds according to Embodiment 1 of the present invention.

FIG. 17 shows a schematic diagram illustrating an exemplary configuration of an apparatus for determination of thresholds according to Embodiment 1 of the present invention.

The configuration of the apparatus shown in FIG. 17 is basically the same as that of the apparatus shown in FIG. 13. FIG. 17 differs from FIG. 13 in the source of operation sounds. Specifically, the apparatus shown in FIG. 13 obtains an operation sound of a subject workpiece 1 that is an industrial product to be a source of an operation sound. On the other hand, the apparatus shown in FIG. 17 obtains an operation sound of a conforming product samples 8 provided in advance. The conforming product sample 8 is the one included in a conforming product sample set 9. The conforming product sample set 9 is composed of a plurality of conforming product samples 8 which are conforming industrial products of the same kind as the subject workpiece 1.

The quality evaluation method based on non-stationary sound described in Embodiment 1 is a combination of the methods shown in the flowcharts shown in FIG. 1 and FIG. 2. The quality evaluation method based on non-statutory sound shown in the flowchart in FIG. 1 and the method of determination of thresholds shown in FIG. 2 are usually executed by a program installed in a computer 5.

In the apparatus shown in FIG. 13, a sound emitted from the subject workpiece 1 is collected by a sound collecting unit 2 and analog-digital converted by an A-D converter 3 into digital data. Next, the digital data is input into the computer 5. Then, the data is displayed on a display 6 connected to the computer 5. A driving unit 4 causes the subject workpiece 1 to operate according to, for example, an input from an input device 7.

In the apparatus shown in FIG. 17, a sound emitted from the conforming product sample 8 drawn from the conforming product sample set 9 is collected by the sound collecting unit 2 and analog-digital converted by the A-D converter 3 into digital data. Next, the digital data is input into the computer 5. Then, the data is displayed on the display 6 connected to the computer 5. The driving unit 4 causes the conforming product sample 8 to operate according to, for example, an input through the input device 7.

The computer 5 may be any computer as long as it may perform the processes described below, and thus there are no special limitations to the specifications of a recording medium, a CPU, and an interface included in the computer 5, and the display 6 and the input device 7 as long as they are configured so as to allow the processes described in Embodiment 1. It is also possible to use a sequencer (sequencer is a registered trademark) or any other device which is capable of logic control or determination instead of the computer 5.

The sound collecting unit 2 may be a microphone, an acceleration sensor, a laser displacement gauge, or any other device of any type or use any method as long as it is capable of converting an acoustic vibration of an operation sound emitted from the subject workpiece 1 into a sound waveform signal.

Figure 26:
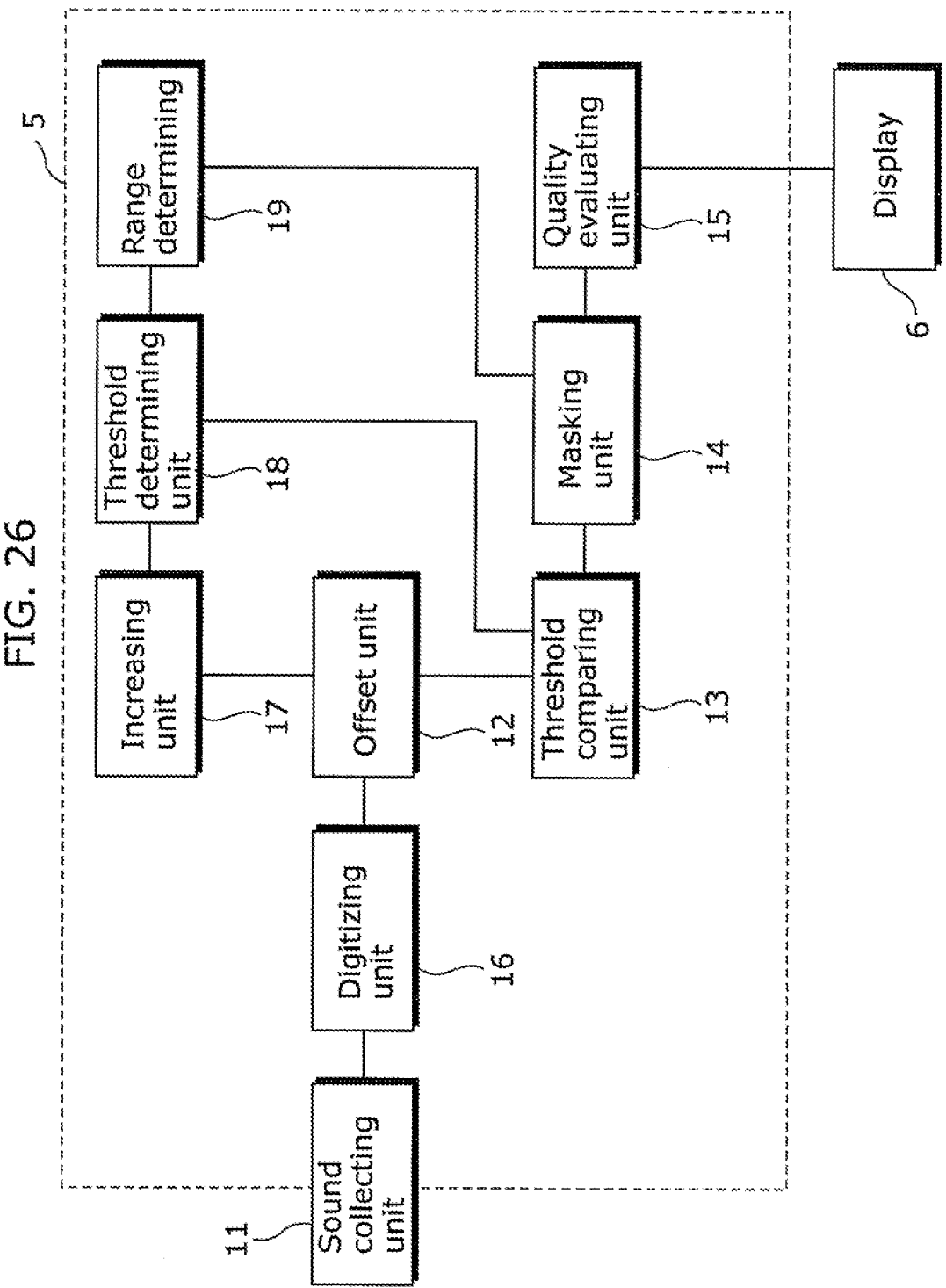
FIG. 26 shows a block diagram illustrating a functional configuration of a computer implemented using software.

FIG. 26 shows a block diagram illustrating a functional configuration of a computer implemented using software according to Embodiment 1. Referring to FIG. 26, the computer 5 has a functional configuration including a digitizing unit 16, an offset unit 12, a threshold comparing unit 13, an increasing unit 17, a masking unit 14, a quality evaluating unit 15, a threshold determining unit 18, and a range determining unit 19. The digitizing unit 16 is connected to the sound collecting unit 11. The offset unit 12 is connected to the digitizing unit 16. The threshold comparing unit 13 and the increasing unit 17 are connected to the offset unit 12. The masking unit 14 is connected to the threshold comparing unit 13. The quality evaluating unit 15 is connected to the masking unit 14 and the display 6. The threshold determining unit 18 is connected to the increasing unit 17 and the threshold comparing unit 13. The range determining unit 19 is connected to the threshold determining unit 18 and the masking unit 14.

The following is an overview of the quality evaluation method shown in FIG. 1, that is, the quality evaluation method based on non-statutory sound.

In Step S0, the process of evaluation is started. First, in Step S1, an operation sound emitted from the subject workpiece 1, which is caused to operate by the driving unit 4, is obtained as a sound waveform signal by the sound collecting unit 2, and the A-D converter 3 converts the sound waveform signal into sound waveform data, which is sound information. Here, the sound collecting unit 2 and the A-D converter 3 function together as a sound collecting unit 11 for obtaining sound information.

The sound waveform data is digitized into psychoacoustic parameters, which are sound evaluation amounts on a time-series basis. The digitalization is performed through calculation by the digitizing unit 16 of the computer 5.

Next, in Step S2, the psychoacoustic parameters obtained in Step 1 are time-offset such that the psychoacoustic parameters are temporally aligned with reference waveform data prepared in advance. The time-offsetting is performed by the offset unit 12.

Next, in Step S3, the psychoacoustic parameters appropriately time-offset in Step S2 are compared with threshold data, which are thresholds prepared in advance. The comparing is performed by the threshold comparing unit 13.

Next, in Step S4, the data resulting from the comparison of the psychoacoustic parameters with the threshold data in Step S3 is masked using masking data prepared in advance so that a part necessary for evaluation is extracted from the resulting data. The masking is performed by the masking unit 14.

Next, in Step S5, using the data resulting from the comparison with the threshold data, masked in Step S4, an evaluation is made as to whether or not the sound waveform data of the subject workpiece 1 obtained in Step S1 indicates an abnormality. The evaluation is made by the quality evaluating unit 15. Then, Step S6 is the end of the process of evaluation.

The processes of Step S1 to Step S5 are individually detailed later.

The following describes the process in the method of determination of thresholds shown in FIG. 2.

In Step S7, the process of determination of thresholds is started. First, in Step S8, sound waveform data of all the number P of conforming product samples 8 prepared in advance is obtained in the same manner as in Step S1, and psychoacoustic parameters are calculated from the sound waveform data. Psychoacoustic parameters of the number P of conforming product samples 8 are thus obtained. The process in Step S7 is performed by the sound collecting unit 11 and the digitizing unit 16.

Next, in Step S9, one of the psychoacoustic parameters of the number of P conforming product samples 8 obtained in Step S8 is selected. The selected psychoacoustic parameter is used as reference waveform data. Then, the other psychoacoustic parameters are time-offset in the same manner as in Step S2 such that the psychoacoustic parameters are temporally aligned with the reference waveform data. The time-offsetting is performed by the offset unit 12.

Next, in Step S10, the psychoacoustic parameters of the number P of conforming product samples 8, which have been temporally aligned by time-offsetting in Step S9, are statistically processed so that sample data of a number Q of pseudo conforming product samples is additionally obtained for a data point of each time. This is preparation for easy determination of thresholds even for the case where the number of the conforming product samples 8 is relatively small. The increasing of the number of data items is performed by the increasing unit 17.

Next, in Step S11, thresholds for determination as to whether or not the operation sound is an abnormal sound is made from the data of the number Q of pseudo conforming product samples additionally obtained in Step S10 and the psychoacoustic parameters of the number P of the conforming product samples 8, using a standard deviation technique or a maximum-minimum technique. The determination is made by the threshold determining unit 18.

Next, in Step S12, a masking range necessary for masking in order to prevent unnecessary overdetection is determined by limiting a range of the sound waveform data with reference to an average value, a maximum value, or an upper threshold of the psychoacoustic parameters obtained in the process of determining the thresholds in Step S11. The determination is made by the range determining unit 19. Then, Step 13 is the end of the process of determining thresholds.

The processes of Step S8 to Step S12 are individually detailed later.

The following describes details of each of Step S1 to Step S5 in the quality evaluation method based on non-stationary sound described above with reference to FIG. 1.

The following describes the process of the obtainment and analysis of sound waveform data in Step S1.

Figure 3:
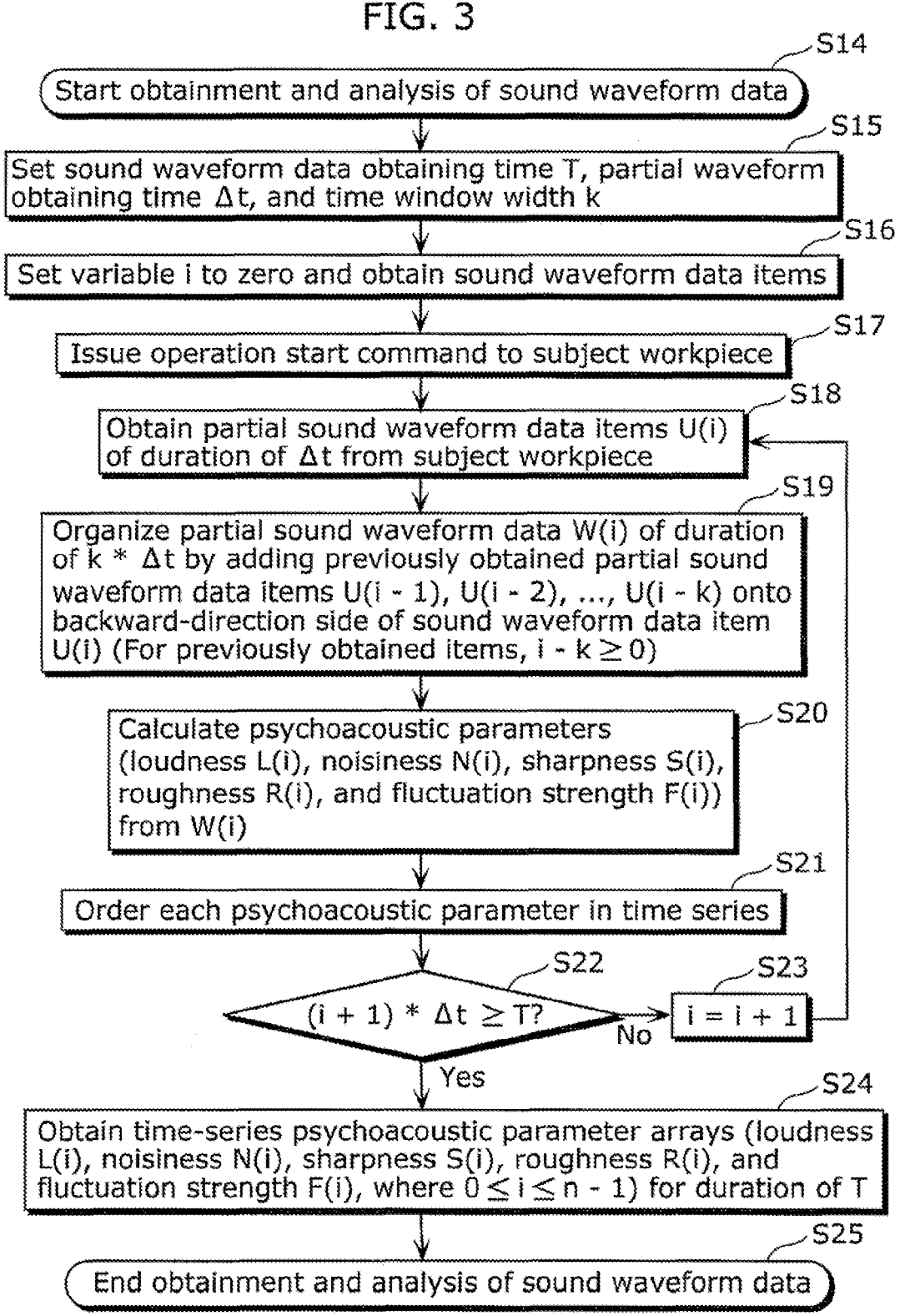
FIG. 3 shows a flowchart illustrating a process of obtainment and analysis of sound waveform data.

FIG. 3 shows a flowchart illustrating the process of the obtainment and analysis of sound waveform data in Step S1 in detail.

In Step S14, the obtainment and analysis of sound waveform data is started. Next, in Step S15, a sound waveform data obtaining time T, a partial waveform obtaining time Δt, and a time window width k are set in preliminary preparation for obtainment of sound waveform data of the subject workpiece 1.

The sound waveform data obtaining time T is set to be sufficiently longer than an operation sound generation time τ of the subject workpiece 1 (for example, T is a time period two seconds longer than the operation sound generation time τ so that a margin period of one second is provided both before and after the operation sound generation time τ). T is set also in the process of the determination of thresholds described later, and thus T set in the process of determination of thresholds is used here as it is.

This is also true to the partial waveform obtaining time Δt and the time window width k. The Δt and k set in the process of determination of thresholds are used as they are. Δt is usually set within a range of 1 millisecond to 2 milliseconds, and k is usually set within a range of 100 to 2000 in consideration of practical capability of the computer 5 and convenience in calculation of psychoacoustic parameters described later.

Next, in Step S16, a variable i, which is used for counting, on a Δt-basis, a cumulative number of obtained sound waveform data items, is set to zero, and then the computer 5 starts obtaining sound waveform data.

Next, in Step S17, the computer 5 issues an operation start command to the subject workpiece 1 via the driving unit 4. Upon receiving the operation start command from the driving unit 4, the subject workpiece 1 starts a predetermined operation, so that the subject workpiece 1 starts generating an operation sound.

Next, in Step S18, the sound collecting unit 2 obtains the operation sound generated in the operation of the subject workpiece 1 as a partial sound waveform data item U(i). The duration of each obtained sound waveform data item is the partial waveform obtaining time Δt.

Figure 14:
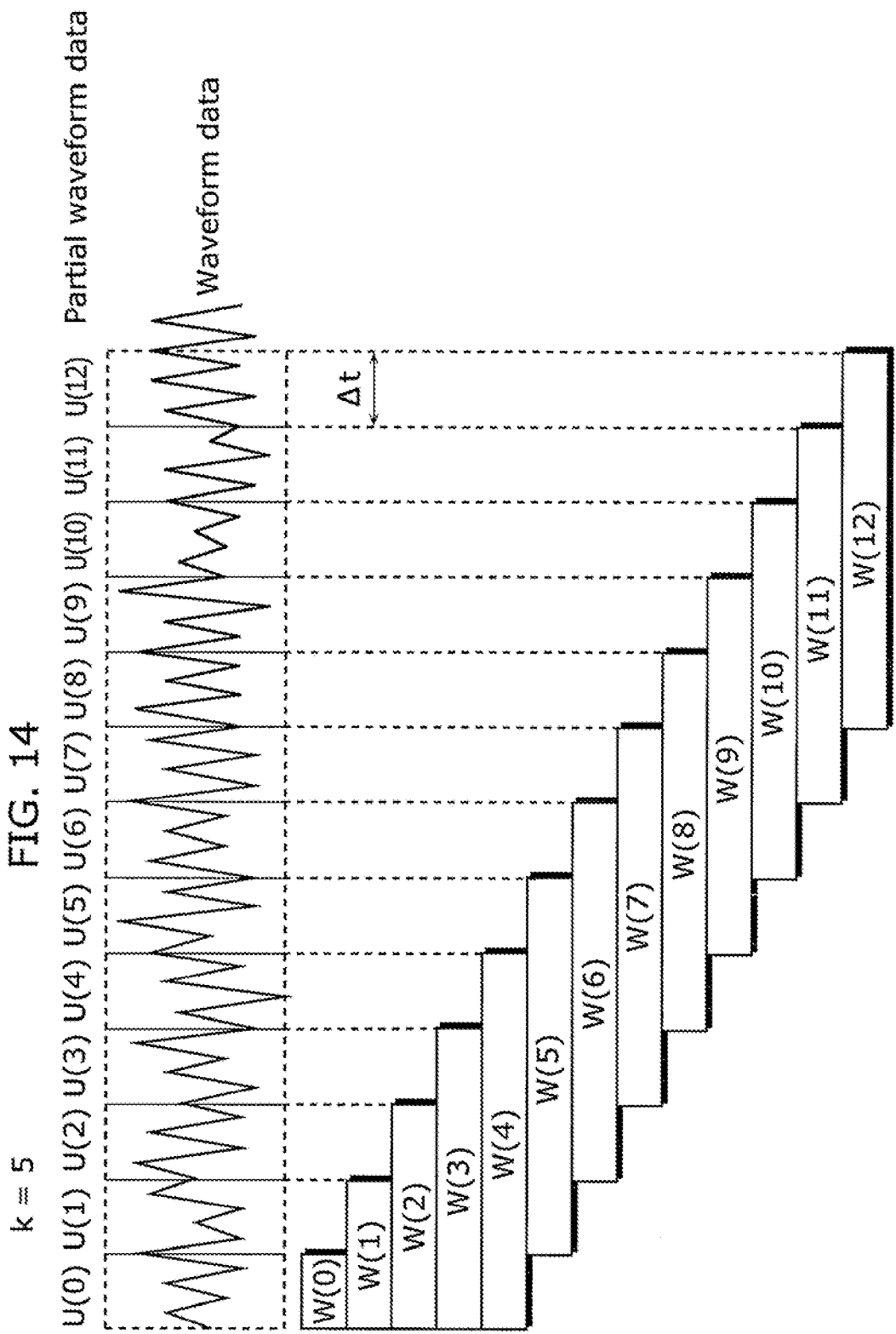
FIG. 14 shows a relationship among sound waveform data, partial sound waveform data U(i), and partial sound waveform data W(i) obtained in the process of obtainment and analysis of sound waveform data and the process of obtainment and analysis of sound waveform data of conforming products.

Next, in Step S19, partial sound waveform data W(i) is organized by adding partial sound waveform data items U(i−1), U(i−2), ... , U(i−k), which are a number of k−1 partial sound waveform data items immediately older than the newest partial sound waveform data item U(i), onto the backward-direction side of the sound waveform data item U(i). The added partial sound waveform data items are arranged in chronological order. The duration of W(i) is k*Δt. The duration of sound waveform data obtained in one operation of obtaining a sound waveform through the sound collecting unit 2 is Δt, but waveform data of the duration of k*Δt, which is to be used for calculation of data necessary in a later step, is thus obtained. However, when i<k, the partial sound waveform data items added on the backward-direction side are only up to U(0) because partial sound waveform data items older than the partial sound waveform data item U(0) at the beginning of the evaluation operation is not available. FIG. 14 illustrates ranges of W(i) for U(i) in the case where k is 5 and is from 0 to 12. Reference to FIG. 14 shows that sound waveform data items are obtained while a time window having a width of five times of Δt is shifted when i is 5 or larger.

Next, in Step S20, psychoacoustic parameters are calculated from the obtained partial sound waveform data W(i). Here, the calculated psychoacoustic parameters are loudness L(i), noisiness N(i), sharpness S(i), roughness R(i), and fluctuation strength F(i).

Psychoacoustic parameters were devised to solve the problem that sound pressure levels which have been conventionally used for sound evaluation may give a result different from a result of sensory evaluation by use of a human sense of hearing, and thus have been proposed as evaluation amounts which highly correlate to the human sense of hearing. Loudness is the magnitude of sound volume perceived by a human. Noisiness is a state of being noisy. Sharpness is metallic feel or shrillness of a sound. Roughness is asperous feel or harshness of a sound. Fluctuation strength is waviness or vacillation of a sound. These parameters are characteristically calculated by a process equivalent to non-linear frequency characteristics of the human sense of hearing. Calculation of these psychoacoustic parameters is described in detail in "Psychoacoustics" written by E. Zwicker and translated by Yukiko Yamada. A method of calculation of loudness is specified in ISO 532 B, and a method of calculation of noisiness is specified in ISO 3891.

Next, in Step S21, each of the psychoacoustic parameters obtained in Step S20 is ordered in a time series. Specifically, the psychoacoustic parameters are calculated on a Δt-basis in Step S20, and thus the number of the values calculated for each of the psychoacoustic parameters is the same as i, which is the variable for counting a cumulative number of obtained sound waveform data items on a Δt-basis. The values of each of the psychoacoustic parameters are therefore arranged in an array of the psychoacoustic parameter according to the variable i.

Next, in Step S22, a determination is made, based on the number i for counting the cumulative number of obtained sound waveform data items on a Δt-basis, as to whether or not a sound waveform data obtaining time has accumulated to reach the sound waveform data obtaining time T. When the sound waveform data obtaining time has not accumulated to reach the sound waveform data obtaining time T, the variable i is incremented by one in Step S23, and the process is continued from Step S18. When the sound waveform data obtaining time has accumulated to reach the sound waveform data obtaining time T, the obtainment of sound waveform data is ended and the process proceeds to Step S24.

In Step S24, time-series arrays of the psychoacoustic parameters for the duration of T are thus obtained by repeatedly performing Step S21. Then, Step S25 is the end of the process of obtainment and analysis of sound waveform data. Here, T is represented by the expression of T=n*Δt, where n denotes the number of data items in the time-series array of each of the psychoacoustic parameters.

In a situation expected for the case where quality of an industrial product is evaluated based on a non-stationary sound, a subject workpiece is measured for an operation sound in a limited time period and the subject workpiece generates the operation sound only for a given operation time τ. In Embodiment 1, the obtainment of sound waveform data is started in Step S16, and the sound waveform data obtaining time T is set with a sufficient margin added to the operation time τ of the subject workpiece (T>τ) as described above. Thus, when a time interval between Step S16 and Step S17, in which an operation start command is issued to the subject workpiece 1, is appropriately set, it is possible to obtain sound waveform data of the operation sound of the subject workpiece 1 to be evaluated such that the sound waveform data includes a certain length of non-operation period at each of its beginning and end within the sound waveform data obtaining time T.

Figure 4:
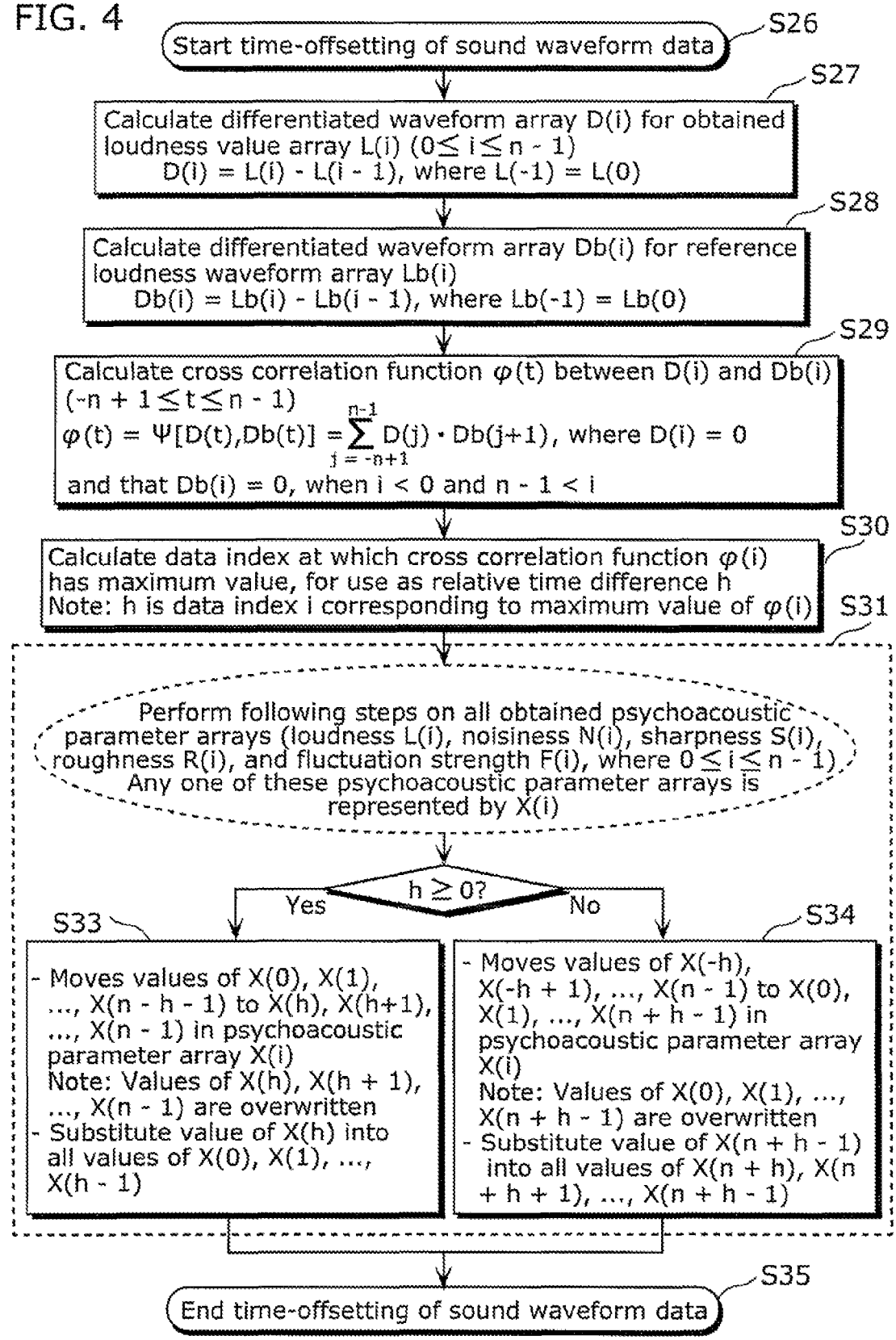
FIG. 4 shows a flowchart illustrating a process of time-offsetting of sound waveform data.

The following describes the process of the time-offsetting of sound waveform data in Step S2. FIG. 4 shows a flowchart illustrating details of the process of time-offsetting of sound waveform data in Step S2.

In Step S26, time-offsetting of sound waveform data is started. Next, in Step S27, a differentiated waveform array D(i) is calculated for the loudness value array L(i) (0≤i≤n-1) of the operation sound of the subject workpiece 1. The loudness value array L(i) has been obtained in Step S1. D(i) is calculated using the following equation (EQ. 1).

$$D(i)=L(i)-L(i-1) \quad \text{(EQ. 1)}$$

Here, L(−1)=L(0), and when i=0, D(0)=L(0)−L(−1)=L(0)−L(0)=0. Although D(i) is an array of what is called difference values, it is herein conveniently referred to as a differentiated waveform array.

Next, in Step S28, a differentiated waveform array Db(i) is calculated for a reference loudness waveform array Lb(i) (0≤i≤n-1) in the same manner as in Step S27. The reference loudness waveform array Lb(i) is set in the method of determination of thresholds described later. Db(i) is calculated using the following equation (EQ. 2).

$$Db(i)=Lb(i)-Lb(i-1) \quad \text{(EQ. 2)}$$

Here, Lb(−1)=Lb(0), and when i=0, Db(0)=Lb(0)−Lb(−1)= Lb(0)−Lb(0)=0.

Next, in Step S29, a cross correlation function φ(t) (−n+ 1≤t≤n-1) between the differentiated waveform arrays D(i) and Db(i), which have been respectively calculated in Step S27 and Step S28, is calculated. The cross correlation function φ(i) is calculated using the following equation (EQ. 3).

$$\phi(t) = \Psi[D(t), Db(t)] = \sum_{j=-n+1}^{n-1} D(j) \cdot Db(j+1) \quad \text{(EQ. 3)}$$

Here, when i<0 and n−1<i, D(i)=0 and Db(i)=0.

The cross correlation function φ(t) is a function for evaluation of the degree of coincidence between the differentiated waveform arrays D(i) and Db(i), where t represents relative temporal difference between D(i) and Db(i). In other words, in the case where φ($t_0$) has a maximum value, D(i) most closely coincides with Db(i) when shifted by the index $t_0$ of the array in the forward direction of the time axis.

Next, in Step S30, a data index t is calculated at which the cross correlation function φ(t) calculated in Step S29 has a maximum value. The calculated data index t is used as a relative time difference h.

Next, in Step S31, subsequent Steps S32, S33, and S34 are performed, using the relative time difference h calculated in Step S30, on all the psychoacoustic parameter arrays calculated in Step S1 (loudness L(i), noisiness N(i), sharpness S(i), roughness R(i), and fluctuation strength F(i), where 0≤i≤n-1). It is to be noted that, in FIG. 4, the process is not described not for each of the psychoacoustic parameters, and any one of the psychoacoustic parameter arrays is represented by X(i). That is, Step S31 is performed on each of the five psychoacoustic parameters.

When the relative time difference h proves to be equal to zero or larger in Step 32, the process proceeds to Step S33. When the relative time difference h proves to be smaller than zero in Step 32, the process proceeds to Step S34, and then the time-offsetting of the sound waveform data ends in Step S35.

Figure 15:
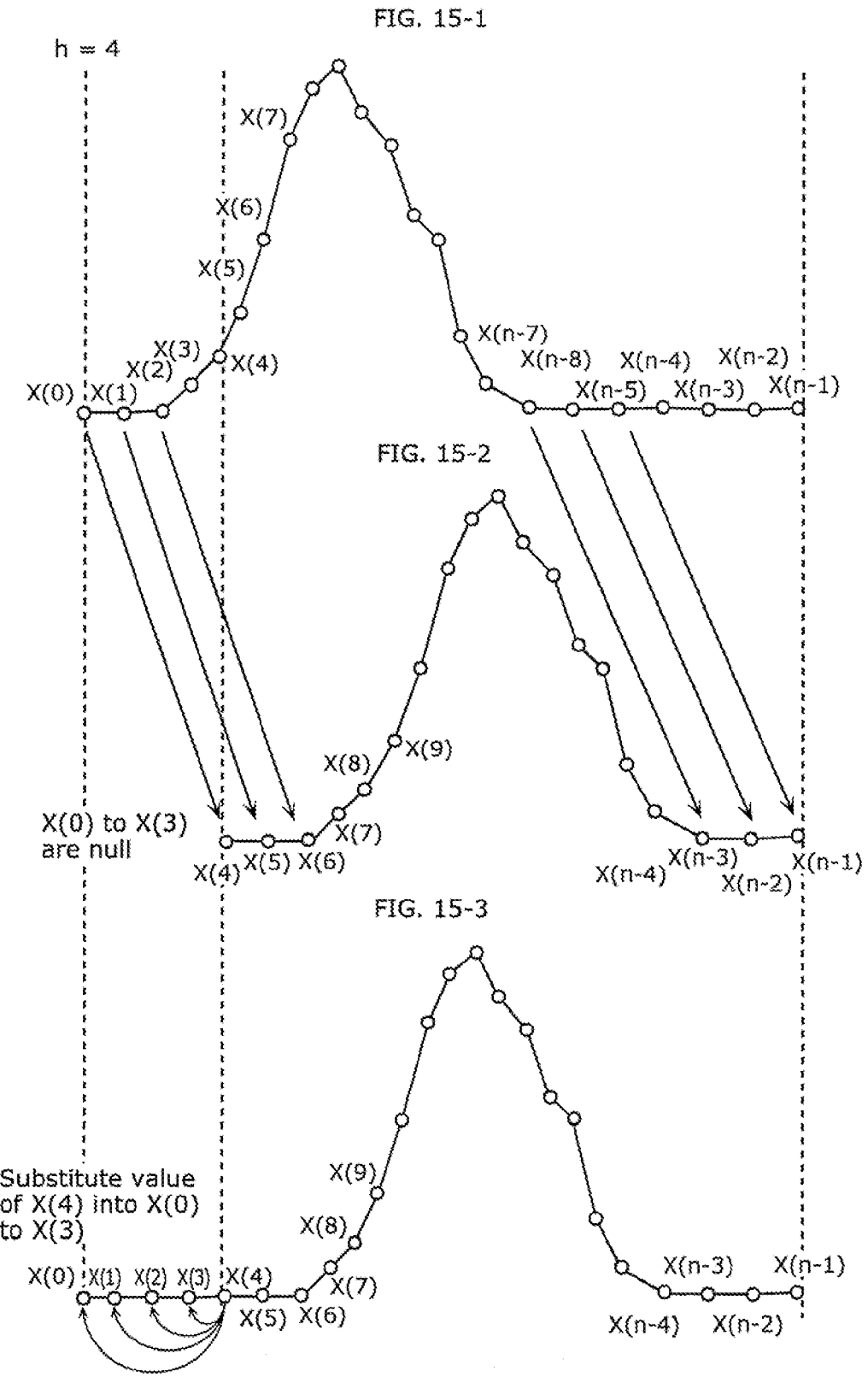
FIG. 15 illustrates shifting of psychoacoustic parameter arrays in the process of time-offsetting of sound waveform data, where a relative time difference h is 4.

In Step 33, among the values of the psychoacoustic parameter array X(i), the values of X(0), X(1), . . . , X(n−h−1) are moved to X(h), X(h+1), . . . , X(n−1), respectively, without changing the order of the values in the array. Original values of X(h), X(h+1), . . . , X(n−1) are thereby overwritten. Next, the value of X(h) is substituted into all the values of X(0), X(1), . . . , X(h−1) among the values of the psychoacoustic parameter array X(i). FIG. 15 shows a schematic diagram illustrating the operation procedure in Step S33, where h is an exemplary value of 4. In the operation in Step S33, the time-series values of psychoacoustic parameter array X(i) as shown in FIG. 15-1, are shifted by h in a direction in which the index i increases as shown in FIG. 15-2. The data items X(0), X(1), . . . , X(h−1) are made null by this operation, and then filled with the value of X(h), which is an end value of the shifted data, as shown in FIG. 15-3. In other words, in the operation in Step S33, the time-series data items in the psychoacoustic parameter array X(i) for the time length of T=n*Δt are shifted by h*Δt in the forward direction of the time series, and a value at an end of the waveform data represents the values of the null data items on the backward side of the time series, resulting from the shifting.

Figure 16:
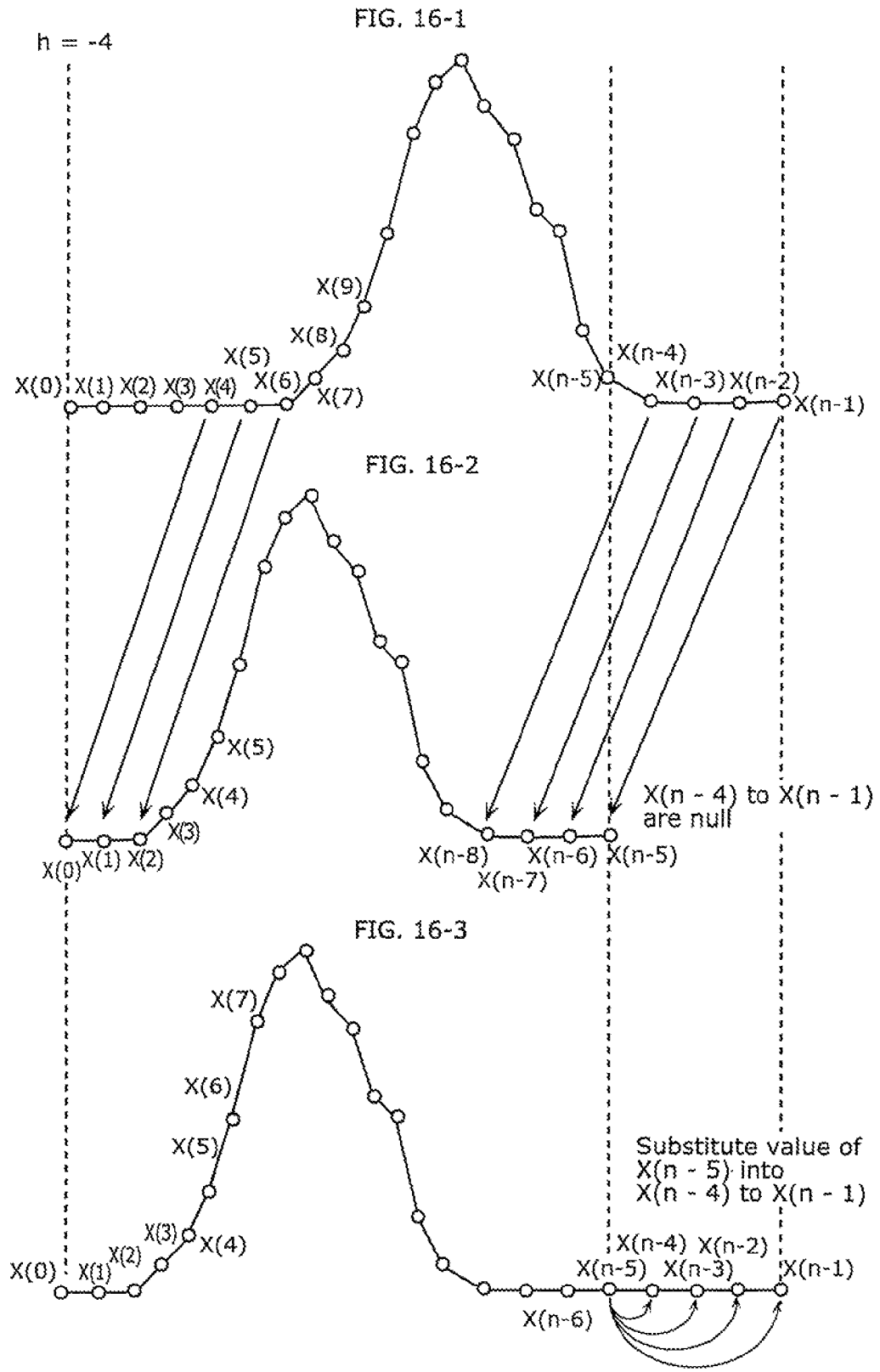
FIG. 16 illustrates shifting of psychoacoustic parameter arrays in the process of time-offsetting of sound waveform data, where a relative time difference h is −4.

In Step S34, among the values of the psychoacoustic parameter array X(i), the values of X(−h), X(−h+1), . . . , X(n−1) are moved to X(0), X(1), . . . , X(n+h−1), respectively, without changing the order of the values in the array. Original values of X(0), X(1), . . . , X(n+h−1) are thereby overwritten. Next, the value of X(n+h−1) is substituted into all the values of X(n+h), X(n+h+1), . . . , X(n−1) among the values of the psychoacoustic parameter array X(i). FIG. 16 shows a schematic diagram illustrating the operation procedure in Step S34, where h is an exemplary value of −4. In the operation in Step S34, the time-series values of psychoacoustic parameter array X(i) as shown in FIG. 16-1, are shifted by −h in a direction in which the index i decreases as shown in FIG. 16-2. The data items X(n+h), X(n+h+1), . . . , X(n−1) are made null by this operation, and then filled with the value of X(n+ h−1), which is an end value of the shifted data, as shown in FIG. 16-3. In other words, in the operation in Step S34, the time-series data items in the psychoacoustic parameter array X(i) for the time length of T=n*Δt are shifted by −h*Δt in the backward direction of the time series, and a value at an end of the waveform data represents the values of the null data items on the forward side of the time series, resulting from the shifting.

By the time-offsetting through the operations from Step S27 to Step 33 or Step S34, the sound waveform data of the psychoacoustic parameter array X(i) is temporally aligned with the reference loudness waveform array Lb(i), which is also an array of data items for n points. This allows comparison of the sound waveform data of sound emitted from the subject workpiece 1 with preliminarily prepared threshold data using the same time line.

Figure 5:
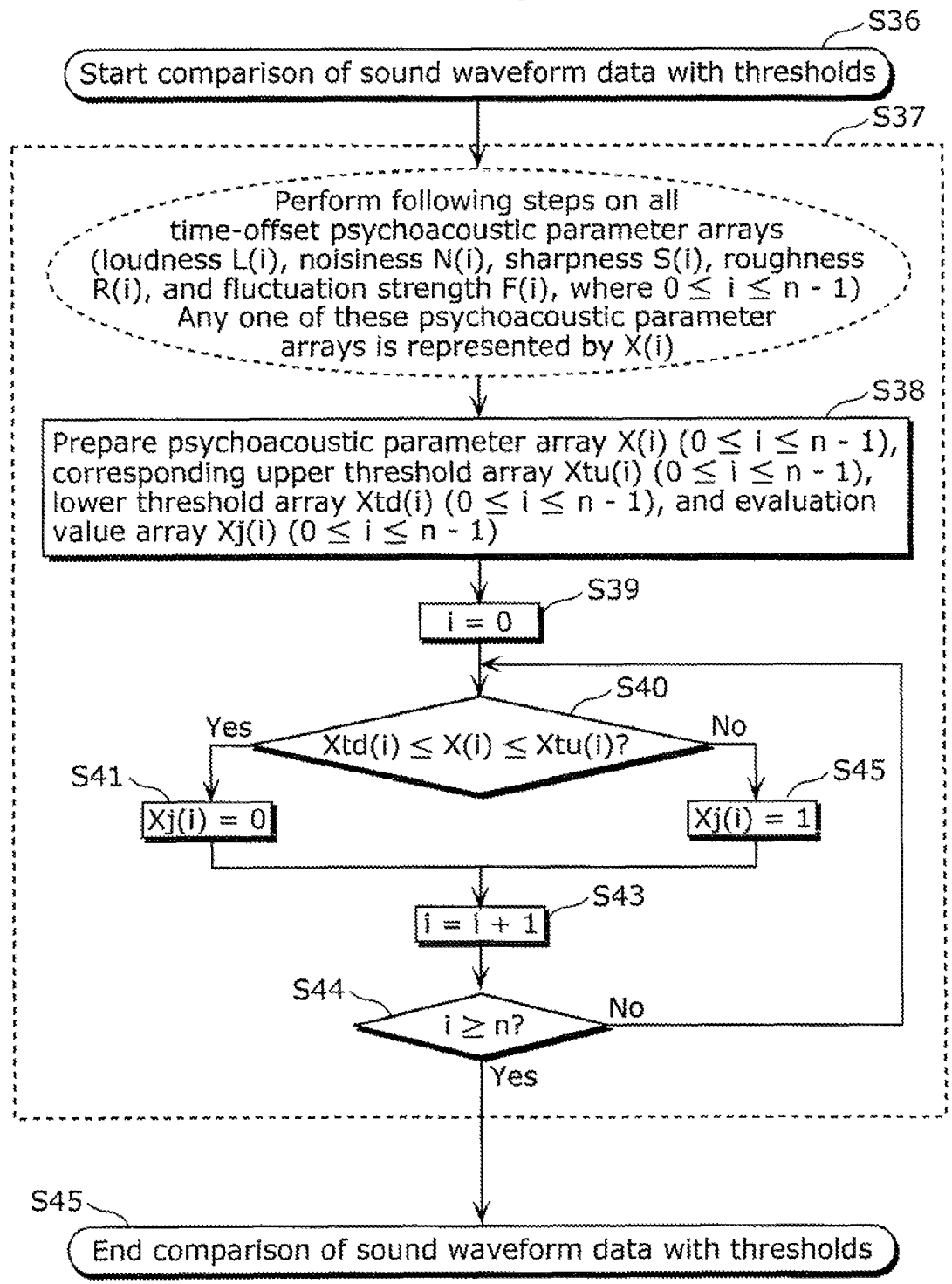
FIG. 5 shows a flowchart illustrating a process of comparison of sound waveform data with thresholds.

The following describes the process of comparison of sound waveform data with thresholds in Step S3. FIG. 5 shows a flowchart illustrating details of the process of comparison of sound waveform data with thresholds in Step S3. The comparison of sound waveform data with thresholds is performed on all the psychoacoustic parameter arrays time-offset in Step S2 (loudness L(i), noisiness N(i), sharpness S(i), roughness R(i), and fluctuation strength F(i), where 0≤i≤n-1). It is to be noted that, in FIG. 5, the process is described not for each of the psychoacoustic parameters, and any one of the psychoacoustic parameter arrays is represented by X(i). In the same manner, an upper threshold array, a lower threshold array, and an evaluation value array of the psychoacoustic parameters in the following description are represented by Xtu(i), Xtd(i), and Xj(i), respectively, and the letter X in these array names is to be read as follows depending on the psychoacoustic parameters: L for loudness, N for noisiness, S for sharpness, R for roughness, and F for fluctuation strength. That is, Step S37 is performed on each of the five psychoacoustic parameters.

In Step S36, the comparison of sound waveform data with thresholds is started and then above mentioned Step S37 is performed. Next, in Step S38, a psychoacoustic parameter array X(i) is prepared along with an upper threshold array Xtu(i), a lower threshold array Xtu(i), and an evaluation value array Xj(i) corresponding to the psychoacoustic parameter for reference, where $0 \leq i \leq n-1$.

Next, in Step S39, the variable i, which specifies a time-series position in each of the arrays as an index of the array, is set to zero. Using the variable i for all of the arrays allows processing of the psychoacoustic parameter array X(i), the upper threshold array Xtd(i), the lower threshold array Xtd(i), and the evaluation value array Xj(i) of the psychoacoustic parameter temporally aligned.

Next, in Step S40, a determination is made as to whether or not a value of the psychoacoustic parameter X(i) matches a condition that the value is equal to or smaller than the value of the upper threshold array Xtu(i) and equal to or larger than the value of the lower threshold array Xtd(i) in the same time-series position. When the condition is satisfied, the process proceeds to Step S41, and zero is substituted into the value of the evaluation value array Xj(i) in the same time-series position. When the condition is not satisfied, the process proceeds to Step S42, and one is substituted into the value of the evaluation value array Xj(i) in the same time-series position.

Next, the variable i is incremented by one in Step S43, and in Step S44 the variable i is compared with n to determine whether or not the variable i is equal to n or larger. The variable i equal to or larger than n indicates that comparison has been made for all the points of the time-series data. Then, the process proceeds to Step S45, where the process of comparison of sound waveform data with thresholds ends. The variable i smaller than n indicates that comparison has not been made for all the points of the time-series data. Then, the process returns to Step S40 and repeats the subsequent steps.

In Step S37, each value of the psychoacoustic parameter array X(i) is compared with an upper threshold and a lower threshold which have been predetermined for the value and in the same time-series position as the value. When the value is within the range between the lower threshold and the upper threshold, zero is substituted into the value of the evaluation value array Xj(i) at the time-series point corresponding to the time-series point of the value. When the value is out of the range, one is substituted into the value of the evaluation value array Xj(i) at the time-series point corresponding to the time-series point of the value. The evaluation value array Xj(i) thus shows at which time-series point the psychoacoustic parameter array X(i) has a value out of the range between the lower and upper thresholds.

Figure 6:
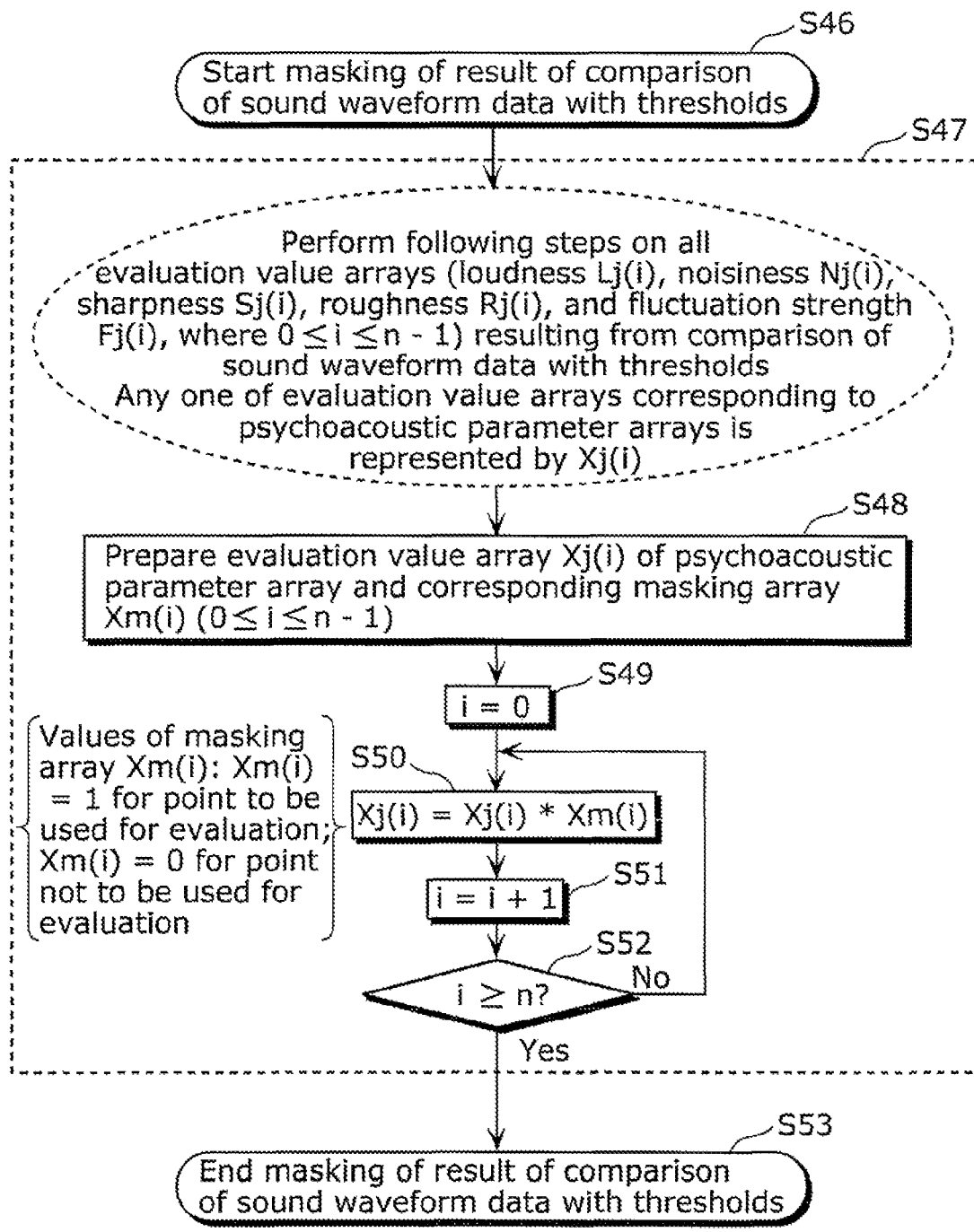
FIG. 6 shows a flowchart illustrating a process of masking of the result of the comparison of sound waveform data with thresholds.

The following describes the process of masking of the result of the comparison of sound waveform data with thresholds in Step S4. FIG. 6 shows a flowchart illustrating details of the process of masking of the result of the comparison of the sound waveform data with thresholds in Step S4. The masking of the result of the comparison of the sound waveform data with thresholds is performed on the evaluation value arrays for all the psychoacoustic parameter arrays (loudness evaluation value array Lj(i), noisiness evaluation value array Nj(i), sharpness evaluation value array Sj(i), roughness evaluation value array Rj(i), and fluctuation strength evaluation value array Fj(i), where $0 \leq i \leq n-1$). The evaluation value arrays reflect the result of the comparison of sound waveform data with thresholds made in Step S3. It is to be noted that, in FIG. 6, the process on the evaluation value arrays is described not for each of the psychoacoustic parameters, and any one of the evaluation value arrays of the psychoacoustic parameter arrays is represented by Xj(i). In the same manner, a masking array prepared for each of the psychoacoustic parameters in the following description is represented by Xm(i), and the letter X in the array name is to be read as follows depending on the psychoacoustic parameters: L for loudness, N for noisiness, S for sharpness, R for roughness, and F for fluctuation strength. That is, Step S47 is performed on each of the five psychoacoustic parameters.

In Step S46, the masking of the result of the comparison of sound waveform data with thresholds is started, and then above mentioned Step S47 is performed. Next, in Step S48, an evaluation value array Xj(i) of a psychoacoustic parameter array is prepared along with a masking array Xm(i) for reference, where $0 \leq i \leq n-1$. The masking array Xm(i) corresponds to the psychoacoustic parameter. The masking array Xm(i) is an array determined in the process of determination of thresholds described later. The masking array Xm(i) has a value of one at a point corresponding to a time-series point of the evaluation value array Xj(i) to be used for evaluation, and zero at a point corresponding to a time-series point of the evaluation value array Xj(i) not to be used for evaluation.

Next, in Step S49, the variable i, which specifies a time-series position in each of the arrays as an index of the array, is set to zero. Using the variable i for all of the arrays allows processing of the evaluation value array Xj(i) of the psychoacoustic parameter array and the masking array Xm(i) corresponding to the psychoacoustic parameter array temporally aligned.

Next, in Step S50, the result of a multiplication of a value of the evaluation value array Xj(i) and a value of the masking array Xm(i) is substituted into the value of the evaluation value array Xj(i) again.

Next, the variable i is incremented by one in Step S51.

Then, in Step S52 the variable i is compared with n to determine whether or not the variable i is equal to n or larger. The variable i smaller than n indicates that masking has not been performed on all the points of the time-series data. Then, the process returns to Step S50 and repeats the subsequent steps. The variable i equal to or larger than n indicates that comparison is made for all the points of the time-series data. Then, the process proceeds to Step S53, where the process of masking of the result of the comparison of sound waveform data with thresholds ends.

In Step S47, the evaluation value array Xj(i) containing the values indicating the result of the evaluation of the psychoacoustic parameter array X(i) is multiplied by the masking array Xm(i), so that information indicating that the value of the psychoacoustic parameter array is out of the range between the thresholds (that is, the point for which the evaluation value array has the value of one) remains only for the point where the masking array has the value of one. Thus, only the necessary part of the result of the evaluation is left.

Figure 7:
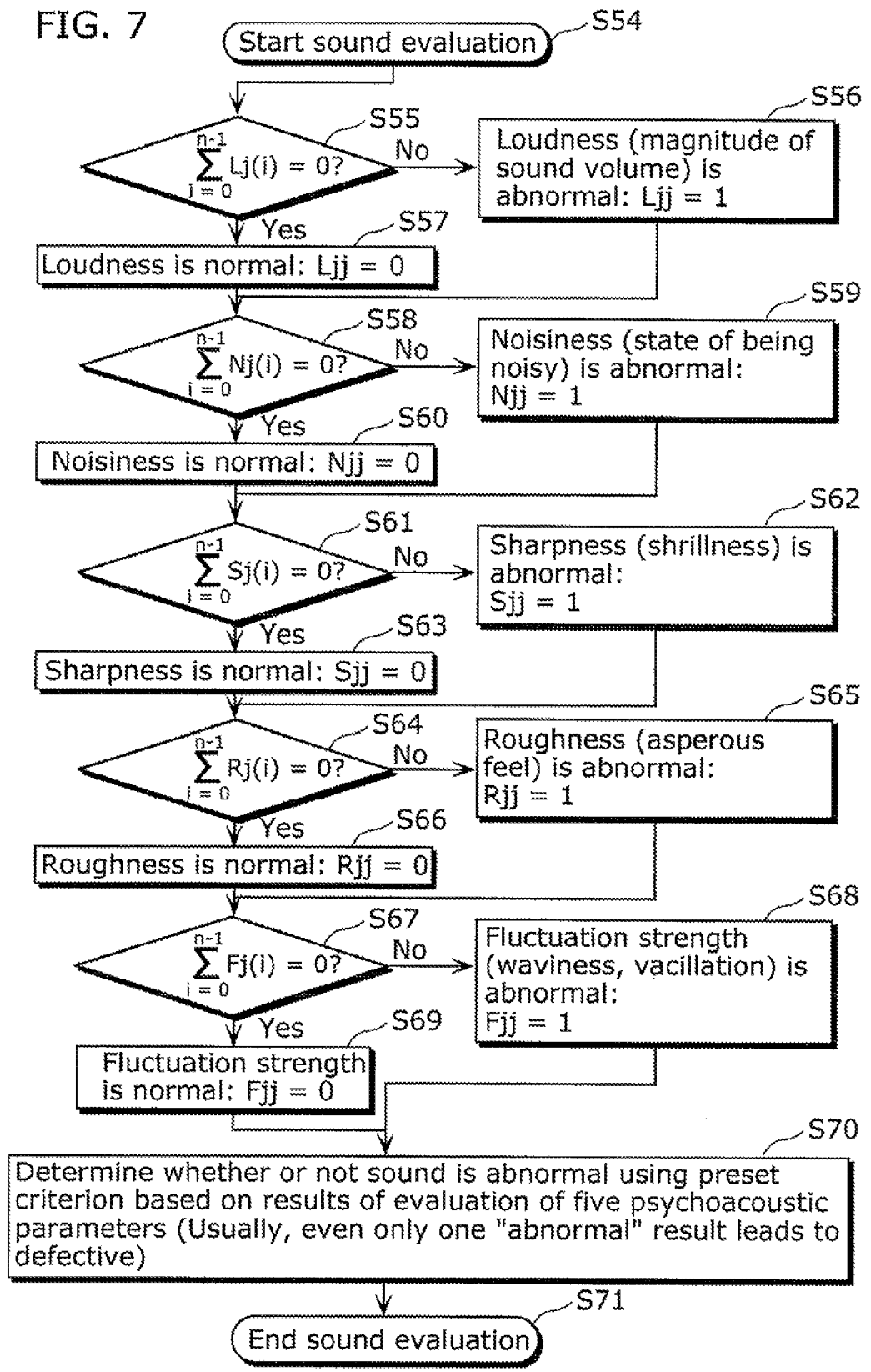
FIG. 7 shows a flowchart illustrating a process of sound evaluation.

The following describes the process of sound evaluation in Step S5. FIG. 7 shows a flowchart illustrating details of the process of sound evaluation in Step S5.

In Step S54, the process of sound evaluation is started. In Step S55, a determination is made as to whether or not the sum of the values of the loudness evaluation value array Lj(i) ($0 \leq i \leq n-1$) is equal to zero. The sum of the values of the Lj(i) equal to zero means that there is no point at which loudness is out of the range between the thresholds, and thus the process proceeds to Step S57, where the loudness is determined to be normal and a loudness evaluation value Ljj is set to zero. The sum of the values of Lj(i) not equal to zero means that there is at least one point at which loudness is out of the range between the thresholds, and thus the process proceeds to Step S56, where it is determined that there is an abnormality in the loudness and a loudness evaluation value Ljj is set to one.

Next, in Step S58, a determination is made as to whether or not the sum of the values of the noisiness evaluation value array Nj(i) (0≤i≤n−1) is equal to zero. The sum of the values of Nj(i) equal to zero means that there is no point at which noisiness is out of the range between the thresholds, and thus the process proceeds to Step S60, where the noisiness is determined to be normal and a noisiness evaluation value Njj is set to zero. The sum of the values of Nj(i) not equal to zero means that there is at least one point at which noisiness is out of the range between the thresholds, and thus the process proceeds to Step S59, where it is determined that there is an abnormality in the noisiness and a noisiness evaluation value Njj is set to one.

Next, in Step S61, a determination is made as to whether or not the sum of the values of the sharpness evaluation value array Sj(i) (0≤i≤n−1) is equal to zero. The sum of the values of the Sj(i) equal to zero means that there is no point at which sharpness is out of the range between the thresholds, and thus the process proceeds to Step S63, where the sharpness is determined to be normal and a sharpness evaluation value Sjj is set to zero. The sum of the values of Nj(i) not equal to zero means that there is at least one point at which sharpness is out of the range between the thresholds, and thus the process proceeds to Step S62, where it is determined that there is an abnormality in the sharpness and a sharpness evaluation value Sjj is set to one.

Next, in Step S64, a determination is made as to whether or not the sum of the values of the roughness evaluation value array Rj(i) (0≤i≤n−1) is equal to zero. The sum of the values of Rj(i) equal to zero means that there is no point at which roughness is out of the range between thresholds, and thus the process proceeds to Step S66, where the roughness is determined to be normal and a roughness evaluation value Rjj is set to zero. The sum of the values of Rj(i) not equal to zero means that there is at least one point at which roughness is out of the range between thresholds, and thus the process proceeds to Step S65, where it is determined that there is an abnormality in the roughness and a roughness evaluation value Rjj is set to one.

Next, in Step S67, a determination is made as to whether or not the sum of the values of the fluctuation strength evaluation value array Fj(i) (0≤i≤n−1) is equal to zero. The sum of the values of Fj(i) equal to zero means that there is no point at which fluctuation strength is out of the range between thresholds, and thus the process proceeds to Step S69, where the fluctuation strength is determined to be normal and a fluctuation strength evaluation value Fjj is set to zero. The sum of the values of Fj(i) equal to zero means that there is at least one point at which fluctuation strength is out of the range between thresholds, and thus the process proceeds to Step S68, where it is determined that there is an abnormality in the fluctuation strength and a fluctuation strength evaluation value Fjj is set to one.

Next, in Step S70, an overall sound evaluation is made based on the evaluation values of Ljj, Njj, Sjj, Rjj, and Fjj for the psychoacoustic parameters. The value of one is substituted into each of the evaluation values when there is an abnormality in the corresponding psychoacoustic parameter, or the value of zero when there is no abnormality. The overall sound evaluation is made using the evaluation values in combination. Combination logic is set in the process of the determination of thresholds described later, but a sound is usually determined to be abnormal when at least one evaluation value indicates abnormality. In this case, a conditional expression to be satisfied when the product is a conforming product is (EQ. 4) as below.

$$(Ljj+Njj+Sjj+Rjj+Fjj)=0 \qquad (EQ.\ 4)$$

(EQ. 4) indicates that the sound is normal when the sum of all the evaluation values is zero, and the subject workpiece 1 is therefore determined to be a conforming product. On the other hand, when not, (EQ. 4) indicates that the sound is abnormal, and the subject workpiece 1 is therefore determined to be defective.

Following these operations, the process of sound evaluation ends in Step S71 with a result of determination as to whether or not a sound emitted from the subject workpiece 1 in operation is abnormal, and thus allowing quality evaluation of the subject workpiece 1 to rate it as a conforming product or a defective product.

The following describes details of each of Steps S8 to Step S12 in the method of determination of thresholds described above with reference to FIG. 2.

Figure 8:
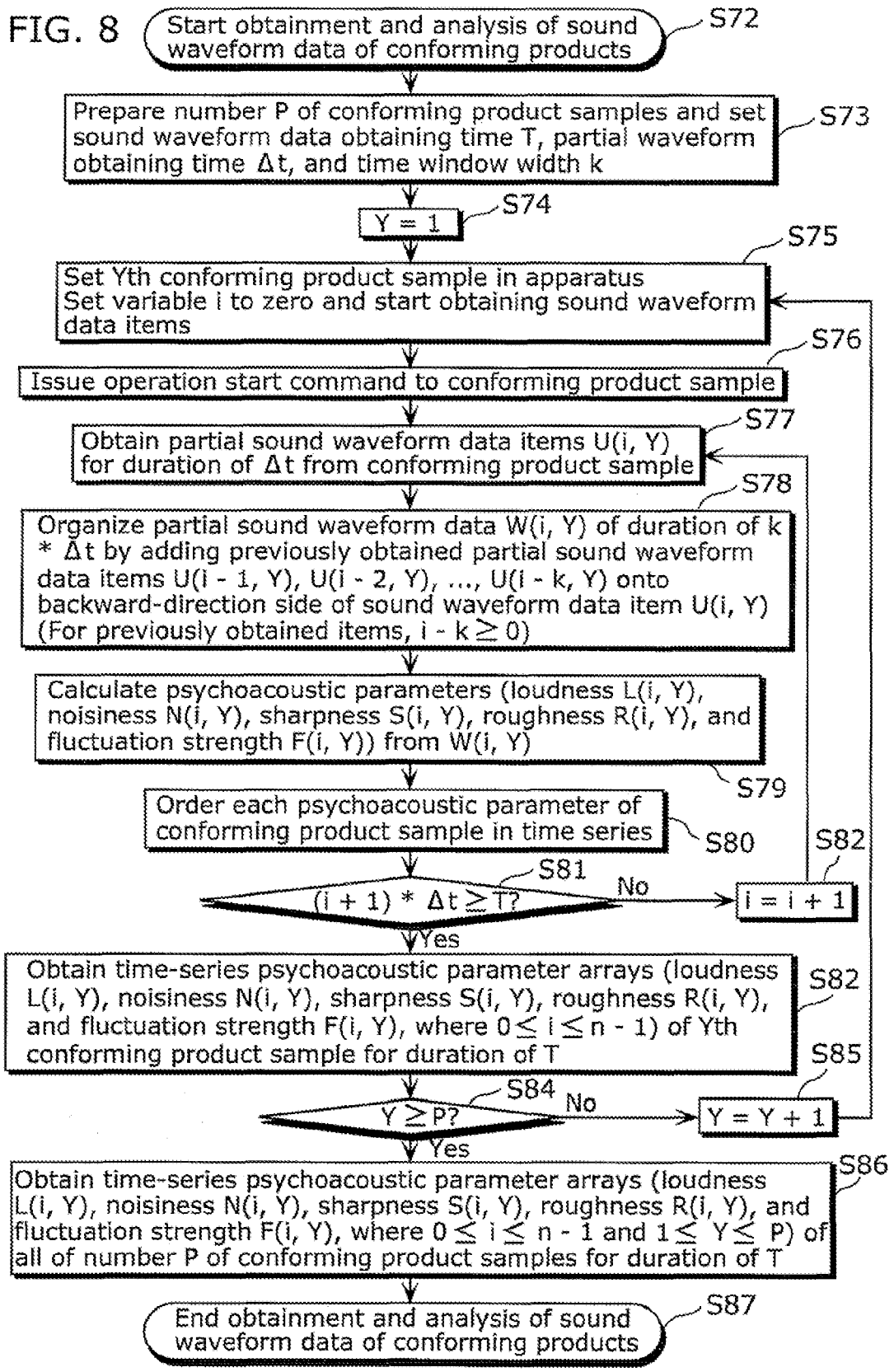
FIG. 8 shows a flowchart illustrating a process of obtainment and analysis of sound waveform data of conforming products.

The following describes the process of obtainment and analysis of sound waveform data of conforming products in Step S8. FIG. 8 shows a flowchart illustrating details of the process of the obtainment and analysis of sound waveform data of conforming products in Step S8.

In Step S72, the process of obtainment and analysis of sound waveform data of conforming products is started. Next, in Step S73, a number P of conforming product samples 8 is prepared as a conforming product sample set 9 as shown in FIG. 17. The conforming product samples 8 are products of the same kind as the subject workpiece 1 and have already been proved to be conforming products. A larger number P may provides more reliable thresholds, but increases burden and trouble of a worker because the number of conforming product samples practically available is limited. In consideration of effect of increase in data of pseudo samples described below, the number P set for the conforming product sample set 9 should be 20 to 50 at minimum, or preferably more than that.

In preliminary preparation for obtainment of sound waveform data of the conforming product samples 8 included in the conforming product sample set 9, a sound waveform data obtaining time T, a partial waveform obtaining time Δt, and a time window width k are set. The sound waveform data obtaining time T is set to be sufficiently longer than an operation sound generation time τ of the conforming product samples (for example, T is a time period two seconds longer than the operation sound generation time τ so that a margin period of one second is provided both before and after the operation sound generation time τ). T set in this step is also used in the process of the quality evaluation based on non-stationary sound described above so that the duration of time-series sound waveform data is unified. This is also true to the partial waveform obtaining time Δt and the time window width k. The Δt and k set in this step are also used as they are in the process of the quality evaluation based on non-stationary sound. Δt is usually set within a range of 1 millisecond to 2 milliseconds, and k is usually set within a range of 100 to 2000 in consideration of practical capability of the computer 5 and convenience in calculation of psychoacoustic parameters described above.

Next, in Step S74, a variable Y, which is used for assigning unique numbers to sound waveform data items to be obtained from the conforming product samples 8, is set to one. Since the number P of the conforming product samples 8 are provided, the range of Y is 1≤Y≤P.

Next, in Step S75, the Yth conforming product sample 8 are selected from among the conforming product sample set 9 and set in an apparatus. Here, one conforming product sample is usually selected from the number P of the conforming product samples 8 not more than once. However, it is also possible that, for example, data is obtained twice for each one of the conforming product sample set so that a number 2*P of sound waveform data items are obtained. In this case, the number P in Step S76 or later is not the number of the samples included in the conforming product sample set 9 but needs to be an actual number of the sound waveform data items. It is to be noted that use of data items repetitively obtained from one product requires care because use of sound waveform data items obtained from one conforming product sample may degrade relevance of determination of thresholds in consideration of variation among individual products, which is the original purpose of this operation. In the present description, data items are not obtained repetitively from one product, but obtained from one conforming product sample 8 is one sound waveform data item. Then, a variable i, which is used for counting, on a $\Delta t$-basis, a cumulative number of obtained sound waveform data items, is set to zero, and then the computer 5 starts obtaining sound waveform data.

Next, in Step S76, the computer 5 issues an operation start command to the conforming product sample 8 via the driving unit 4. Upon receiving the operation start command from the driving unit 4, the conforming product sample 8, which is the subject workpiece 1, starts a predetermined operation, so that the conforming product sample 8 starts generating an operation sound.

Next, in Step S77, the sound collecting unit 2 obtains the operation sound generated in the operation of the conforming product sample 8 as a partial sound waveform data item $U(i, Y)$. The duration of each obtained sound waveform data item is the partial waveform obtaining time $\Delta t$.

Next, in Step S78, partial sound waveform data $W(i, Y)$ is organized by adding partial sound waveform data items $U(i-1, Y)$, $U(i-2, Y)$ ... $U(i-k, Y)$, which are a number $k-1$ of partial sound waveform data items immediately older than the newest partial sound waveform data item $U(i, Y)$, onto the backward-direction of the sound waveform data item $U(i, Y)$. The added partial sound waveform data items are arranged in chronological order. The duration of $W(i, Y)$ is $k*\Delta t$. The duration of a sound waveform data item obtained in one operation of obtaining a sound waveform through the sound collecting unit 2 is $\Delta t$, but waveform data of the duration of $k*\Delta t$, which is to be used for calculation of data necessary in a later step, is thus obtained. However, when $i<k$, the partial sound waveform data items added on the backward-direction side are only up to $U(0, Y)$ are because partial sound waveform data items older than the partial sound waveform data item $U(0, Y)$ at the beginning of the evaluation operation is not available. The operation in Step S78 is the same as the operation of sound waveform data described above with reference to FIG. 14 for Step S19 in the process of evaluation of non-stationary sound.

Next, in Step S79, psychoacoustic parameters are calculated from the obtained partial sound waveform data $W(i, Y)$. Psychoacoustic parameters and calculation thereof have been described have been detailed for the description of Step S20 of the process of evaluation of non-stationary sound, and thus they are not described here.

Next, in Step S80, each of the psychoacoustic parameters obtained in Step S79 is ordered in a time series. Specifically, the psychoacoustic parameters are calculated on a $\Delta t$-basis in Step S79, and thus the number of the values calculated for each of the psychoacoustic parameters is the same as i, which is the variable for counting a cumulative number of obtained sound waveform data items on a $\Delta t$-basis. The values of each of the psychoacoustic parameters are therefore arranged in an array of the psychoacoustic parameter according to the variable i.

Next, in Step S81, a determination is made, based on the number i for counting the cumulative number of obtained sound waveform data items counted on a $\Delta t$-basis, as to whether or not a sound waveform data obtaining time has accumulated to reach the sound waveform data obtaining time T. When the sound waveform data obtaining time has not accumulated to reach the sound waveform data obtaining time T, the variable i is incremented by one in Step S82, and the process is continued from Step S77. When the sound waveform data obtaining time has accumulated to reach the sound waveform data obtaining time T, the obtainment of sound waveform data is ended and the process proceeds to Step S83.

In Step S83, time-series arrays of the psychoacoustic parameters for the duration of T are thus obtained by repeatedly performing Step S77 to Step S81. Here, T is represented by the expression of $T=n*\Delta t$, where n denotes the number of data items in the time-series array of each of the psychoacoustic parameters.

Next, in Step S84, Y is compared with P to determine whether or not Y is equal to or larger than P. Y smaller than P indicates that the sound waveform data has not obtained from all the conforming product samples included in the conforming product sample set 9. Then, Y is incremented by one in Step S85, and the process returns to Step S75 and repeats the subsequent steps. Y equal to or larger than P indicates that the sound waveform data has obtained from all the conforming product samples included in the conforming product sample set 9. Then, the process proceeds to Step S86.

In Step S86, time-series arrays of the psychoacoustic parameters for the number P samples included in the conforming product sample set 9 are thus obtained by repeatedly performing Step S75 to Step S85. Then, Step S87 is the end of the process of obtainment and analysis of sound waveform data of conforming products.

As shown in the detailed description of the quality evaluation method based on the non-stationary sound, the obtainment of sound waveform data items is started in Step S75, and the sound waveform data obtaining time T is set with a sufficient margin added to the operation time duration $\tau$ of the subject workpiece ($T>\tau$). Thus, when a time interval between Step S75 and Step S76, in which an operation start command is issued to the conforming product samples 8, is appropriately set, it is possible to obtain sound waveform data of the operation sound of the conforming product samples 8 to be evaluated such that the sound waveform data includes a certain length of non-operation period at each of its beginning and end within the sound waveform data obtaining time T.

Figure 9:
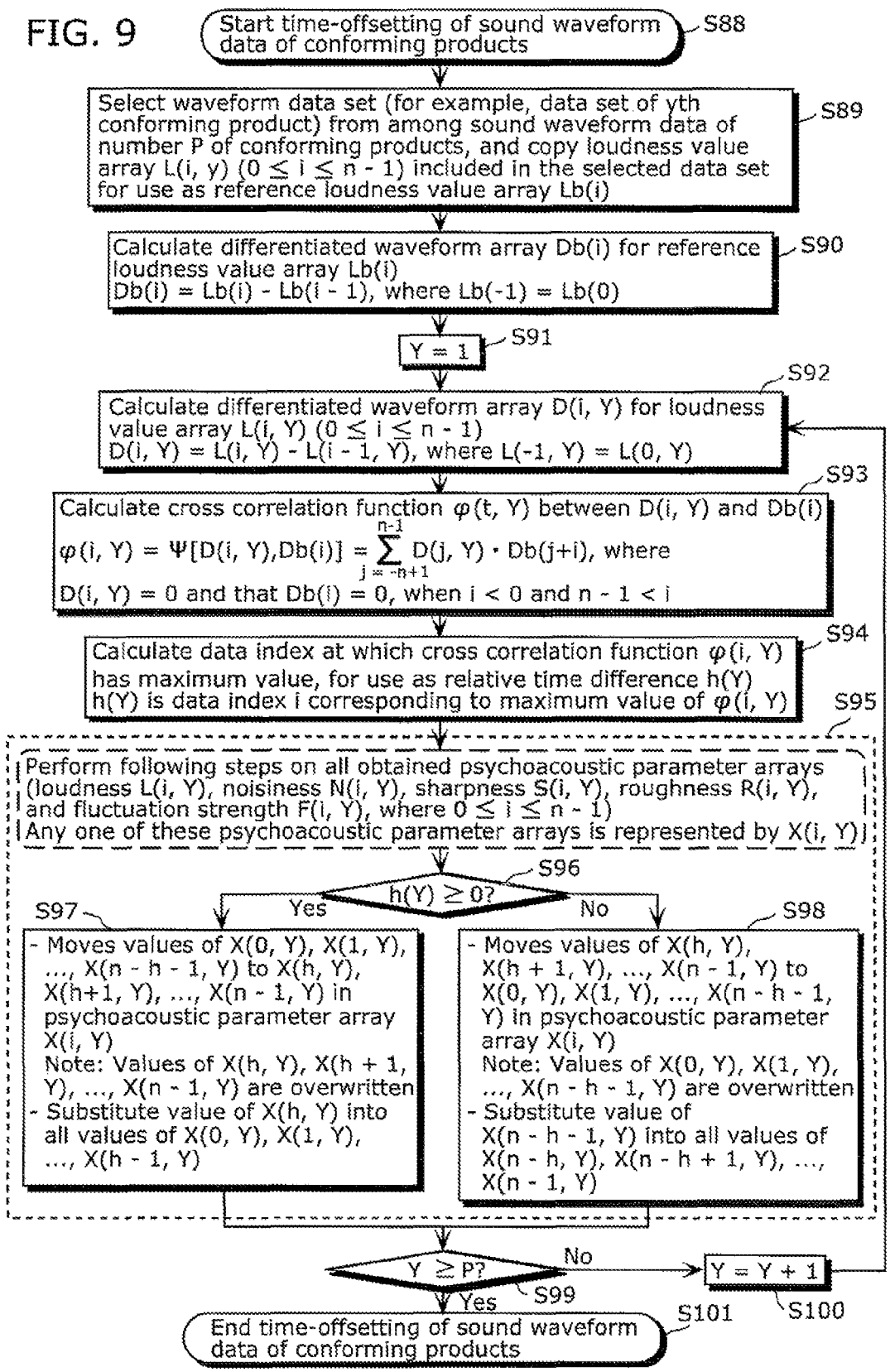
FIG. 9 shows a flowchart illustrating a process of time-offsetting of sound waveform data of conforming products.

The following describes the process of time-offsetting of sound waveform data of conforming products in Step S9. FIG. 9 shows a flowchart illustrating details of the process of time-offsetting of sound waveform data of conforming products in Step S9.

In Step S88, time-offsetting of sound waveform data of conforming products is started. Next, in Step S89, a data set (for example, a data set of the yth conforming product, where $0 \le y \le P$) is selected from the sound waveform data of psychoacoustic parameters of the number P of the conforming product samples 8 obtained in Step S8. Then, the data array of the loudness value array $L(i, y)$ ($0 \le i \le n-1$) is copied to be used as a reference loudness waveform array $Lb(i)$.

Next, in Step S90, the differentiated waveform array Db(i) is calculated for the reference loudness waveform array Lb(i) (0≤i≤n−1) in the same manner as described for Step S28. Db(i) is calculated using the same equation (EQ. 2).

Next, in Step S91, the variable Y, which is used for specifying numbers assigned to the sound waveform data items obtained for each of the number P of the conforming product samples 8 included in the conforming product sample set 9 in Step S8 and to the psychoacoustic parameter arrays, is set to one.

Next, in Step S92, a differentiated waveform array D(i, Y) is calculated for the loudness value array L(i, Y) (0≤i≤n−1). D(i) is calculated using the following equation (EQ. 5).

$$D(i,Y)=L(i,Y)-L(i-1,Y) \quad (EQ. 5)$$

Here, L(−1, Y)=L(0, Y), and when i=0, D(0, Y)=L(0, Y)−L(−1, Y)=L(0, Y)−L(0, Y)=0.

Next, in Step S93, a cross correlation function φ(t, Y) (−n+1≤t≤n−1) between the differentiated waveform arrays D(i,Y) and Db(i) respectively calculated in Step S90 and Step S92 is calculated. The cross correlation function φ(t, Y) is calculated using the following equation (EQ. 6).

$$\phi(t, Y) = \Psi[D(t, Y), Db(t)] = \sum_{j=-n+1}^{n-1} D(j, Y) \cdot Db(j+t) \quad (EQ. 6)$$

Here, when i<0 and n−1<i, D(i, Y)=0 and Db(i)=0.

The cross correlation function φ(t, Y) is a function for evaluation of the degree of coincidence between the differentiated waveform arrays D(i, Y) and Db(i), where t represents relative temporal difference between D(i, Y) and Db(i). In other words, in the case where φ($t_0$, Y) has the maximum value, D(i,Y) most closely coincides with Db(i) when shifted by the index $t_0$ of the array in the forward direction of the time axis.

Next, in Step S94, a data index t is calculated at which the cross correlation function φ(t,Y) calculated in Step S93 has a maximum value. The calculated data index t is used as a relative time difference h(Y).

Next, in Step S95, subsequent Steps S96, S97, and S98 are performed using the relative time difference h(Y) calculated in Step S94 on all the psychoacoustic parameter arrays calculated in Step S8 (loudness L(i, Y), noisiness N(i, Y), sharpness S(i, Y), roughness R(i, Y), and fluctuation strength F(i, Y), where 0≤i≤n−1). It is to be noted that, in FIG. 9, the process is not described not for each of the psychoacoustic parameters, and any one of the psychoacoustic parameter arrays is represented by X(i, Y). That is, Step S95 is performed on each of the five psychoacoustic parameters.

When the relative time difference h(Y) proves to be equal to zero or larger in Step 96, the process proceeds to Step S97. When the relative time difference h proves to be smaller than zero in Step 96, the process proceeds to Step S98.

Figure 18:
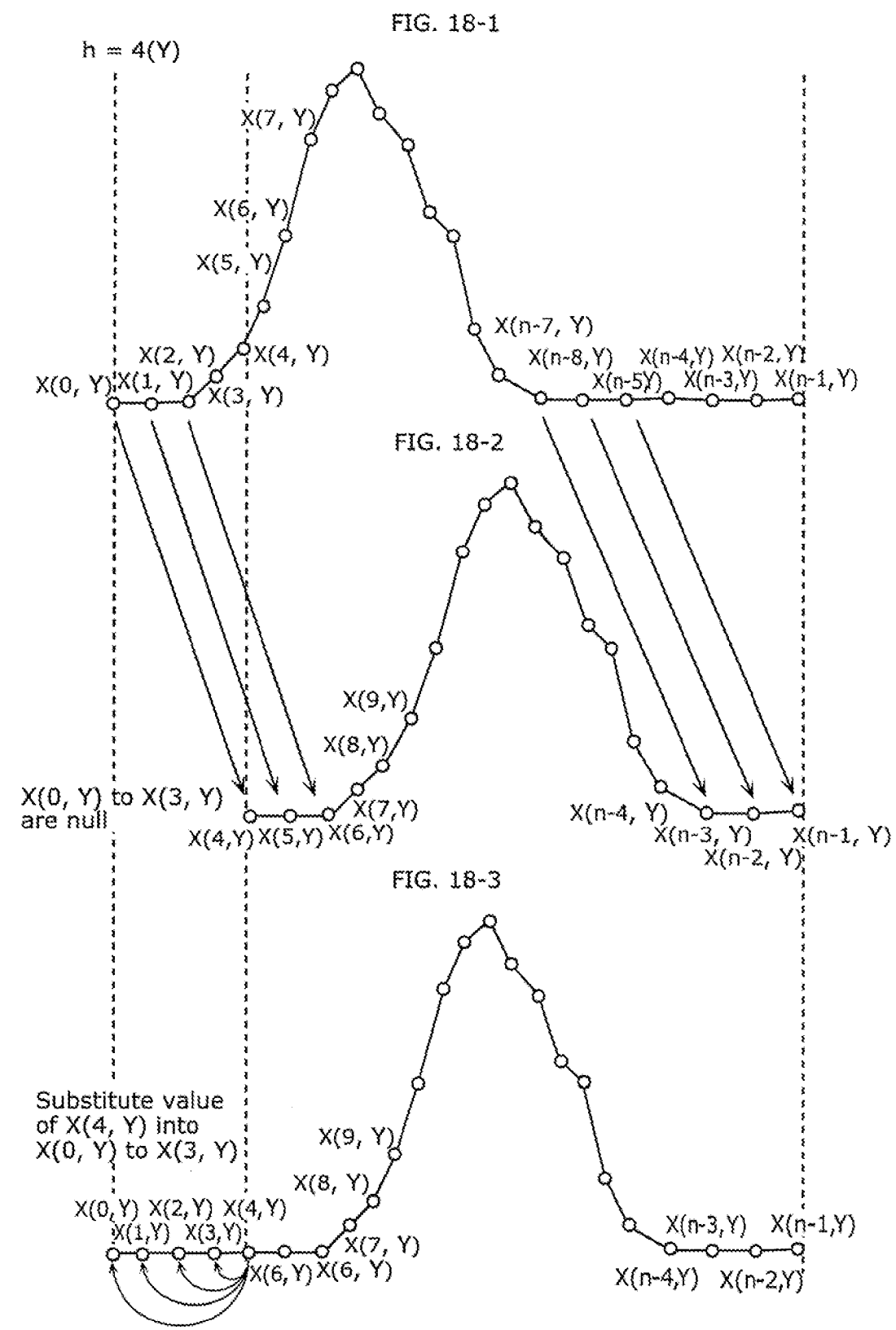
FIG. 18 illustrates shifting of psychoacoustic parameter arrays in the process of time-offsetting of sound waveform data of conforming products, where a relative time difference h(Y) is 4.

In Step S97, among the values of the psychoacoustic parameter array X(i, Y), the values of X(0, Y), X(1, Y), ..., X(n−h(Y)−1, Y) are moved to X(h(Y), Y), X(h(Y)+1, Y), ..., X(n−1, Y), respectively, without changing the order of the values in the array. Original values of X(h(Y), Y), X(h(Y)+1,Y), ..., X(n−1, Y) are thereby overwritten. Next, the value of X(i,Y) is substituted into all the values of X(0,Y), X(1,Y), ..., X(h(Y)−1,Y) among the values of the psychoacoustic parameter array X(h(Y), Y). FIG. 18 shows a schematic diagram illustrating the operation procedure in Step S97, where h(Y) is an exemplary value of 4. In the operation in Step S97, the time-series values of psychoacoustic parameter array X(i, Y) as shown in FIG. 18-1, are shifted by h(Y) in a direction in which the index i increases as shown in FIG. 18-2. The data items X(0,Y), X(1,Y), X(h(Y)−1,Y) are made null by this operation, and then filled with the value of X(h(Y),Y), which is an end value of the shifted, data, as shown in FIG. 18-3. The operation in Step 97 is the same as the operation performed in the above Step S33.

Figure 19:
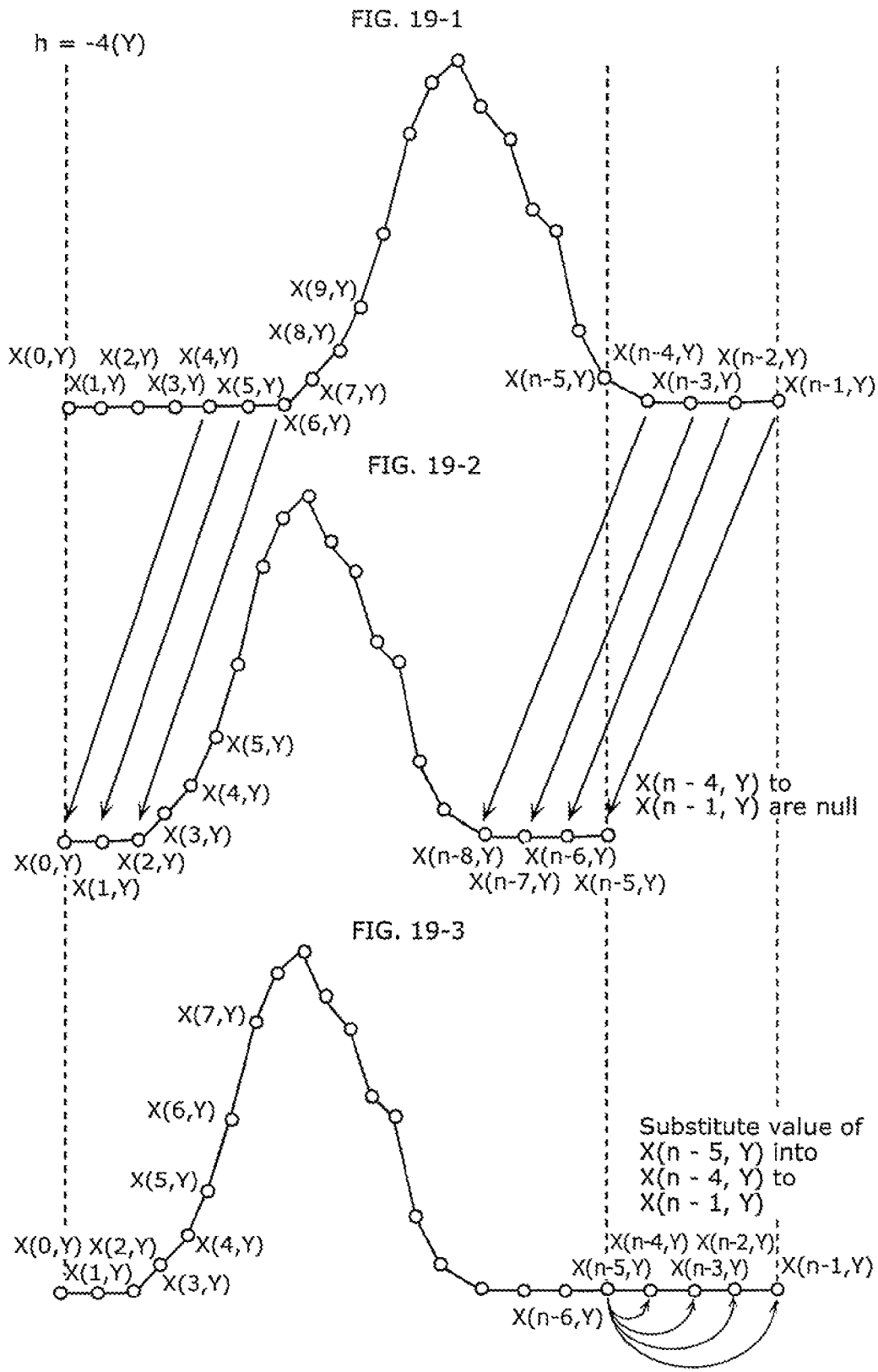
FIG. 19 illustrates shifting of psychoacoustic parameter arrays in the process of time-offsetting of sound waveform data of conforming products, where a relative time difference h(Y) is −4.

In Step S98, among the values of the psychoacoustic parameter array X(i, Y), the values of X(−h(Y), Y), X(−h(Y)+1, Y), ..., X(n−1, Y) are moved to X(0, Y), X(1, Y), ..., X(n+h(Y)−1, Y), respectively, without changing the order of the values in the array. Original values of X(0, Y), X(1, Y), ..., X(n+h(Y)−1, Y) are thereby overwritten. Next, the value of X(n+h(Y)i−1, Y) is substituted into all the values of X(n+h(Y), V), X(n+h(Y)+1, Y), ..., X(n−1, Y) among the values of the psychoacoustic parameter array X(i, Y). FIG. 19 shows a schematic diagram illustrating the operation procedure in Step S98, where h(Y) is an exemplary value of −4. In the operation in Step S98, the time-series values of psychoacoustic parameter array X(i, Y) as shown in FIG. 19-1, are shifted by −h(Y) in a direction in which the index i decreases as shown in FIG. 19-2. The data items X(n+h(Y), Y), X(n+h(Y)+1,Y), ..., X(n−1,Y) are made null by this operation, and then filled with the value of X(n+h−1, Y), which is an end value of the shifted data, as shown in FIG. 19-3. The operation in Step 98 is the same as the operation performed in the above Step S34.

Then, in Step S99, the variable Y is compared with P to determine whether or not the variable Y is equal to P or larger. Y smaller than P indicates that the sound waveform data has not obtained from all the conforming product samples included in the conforming product sample set 9. Then, Y is incremented by one in Step S100, and the process returns to Step S91 and repeats the subsequent steps. Y equal to or larger than P indicates that the sound waveform data has obtained from all the conforming product samples included in the conforming product sample set 9. Then, the process proceeds to Step S101 where the process of time-offsetting of sound waveform data of conforming products ends.

By the time-offsetting through the operations from Step S89 to Step 99 or Step S100, the sound waveform data of the psychoacoustic parameter array X(i,Y) (0≤i≤n−1), which has been obtained from the conforming product sample set 9 of the number P of the conforming product samples, is temporally aligned with the reference loudness waveform array Lb(i), which is also an array of data items for n points. This allows comparison of the sound waveform data of sound emitted from all the conforming product samples 8 with preliminarily prepared threshold data using the same time line.

Figure 10:
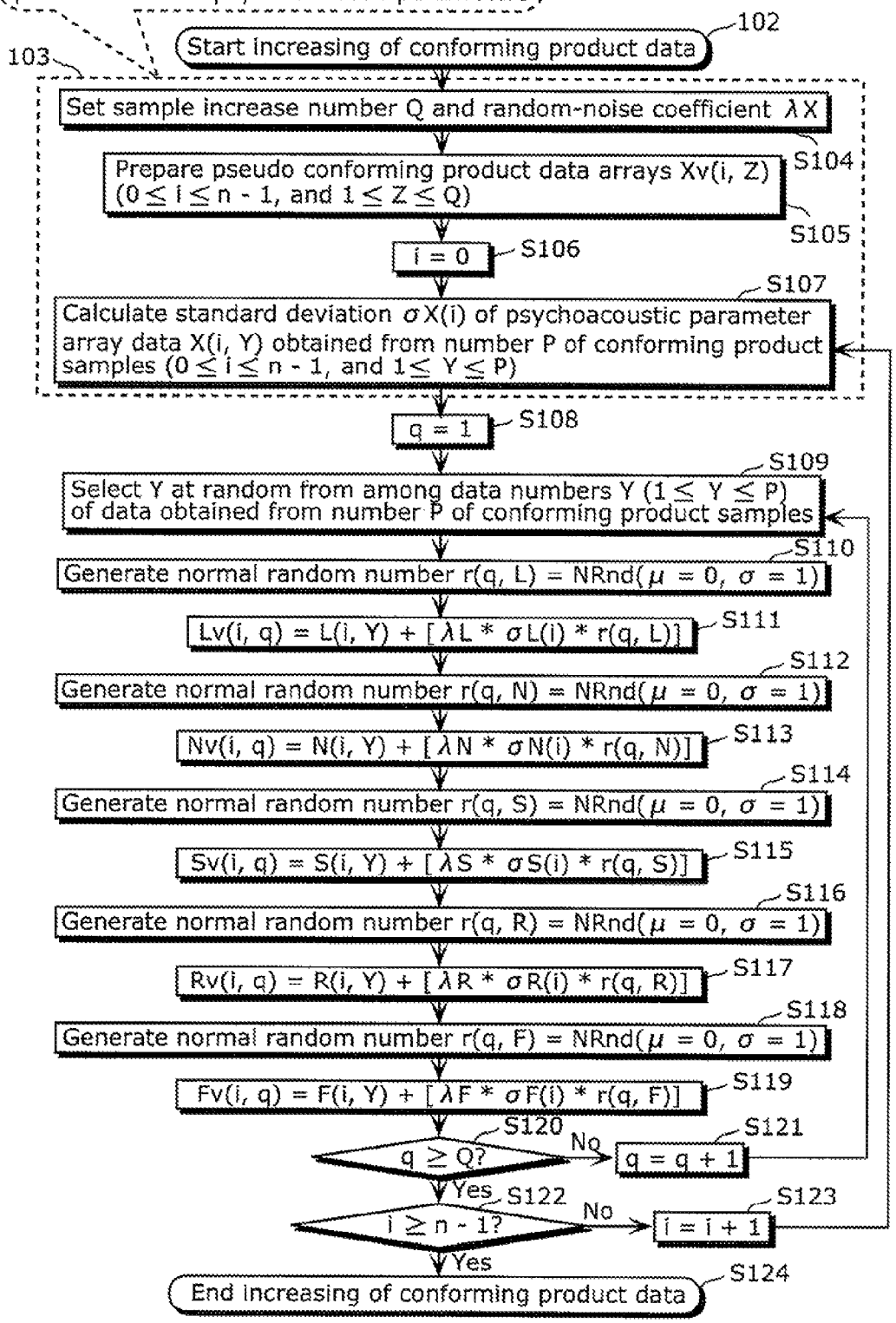
FIG. 10 shows a flowchart illustrating a process of increasing of the number of conforming product data items.

The following describes the process of increasing of the number of conforming product data items in Step S10. FIG. 10 shows a flowchart illustrating details of the process of increasing of the number of conforming product data items in Step S10. The increasing of the number of conforming product data is performed on all the psychoacoustic parameter arrays of the number P of the conforming product samples 8 included in the conforming product sample set 9 and time-offset in Step S9. The psychoacoustic parameter arrays are as follows, where 0≤i≤n−1, and 1≤Y≤P: loudness L(i, Y), noisiness N(i, Y), sharpness S(i, Y), roughness R(i, Y), and fluctuation strength F(i, Y). It is to be noted that, in FIG. 10, the process is not described not for each of the psychoacoustic parameters, and any one of the psychoacoustic parameter arrays is represented by X(i, Y). In the same manner, a pseudo conforming product data array, a standard deviation array, and a random-noise coefficient which correspond to each of the psychoacoustic parameters in the following description is represented by Xv(i, Z), σX(i), and λX, respectively, and the letter X in the array names is to be read as follows depending on the psychoacoustic parameters: L for loudness, N for noisiness, S for sharpness, R for roughness, and F for fluctuation strength. That is, the steps included in Step S103 are performed on each of the five psychoacoustic parameters.

In Step S102, increasing of the number of conforming product data items is started, and then, in Step S104, a sample increase number Q and a random-noise coefficient λX are set. Q is set to be a number of necessary pseudo conforming products from which data is to be obtained. The number Q of pseudo conforming products are used along with previously obtained data of the number P of the conforming product samples 8 in the below-mentioned process of determination of thresholds. It is appropriate that the sample increase number Q is determined such that the sum of P and Q is within the range of approximately 200 to 500 in consideration of time required for data processing and the number of samples usually necessary for statistical processing. The random-noise coefficient λX is used for determining artificial deviation in the pseudo conforming product data in subsequent steps. Experience has shown that a random-noise coefficient λX of approximately 0.2 to 0.5 provides preferable pseudo conforming product data. Random-noise coefficients are usually set to the same number for all the psychoacoustic parameter. However, it is also possible that random-noise coefficients set for the psychoacoustic parameters are all different in consideration of measurement environment or the number of the conforming product samples 8.

Next, in Step S105, a pseudo conforming product data array Xv(i, Z) ($0 \leq i \leq n-1$, and $1 \leq Z \leq Q$) is prepared for each feature quantity. The pseudo conforming product data array Xv stores pseudo conforming product data items to be generated in subsequent steps.

Next, in Step S106, the variable i, which specifies a time-series position in each of the arrays as an index of the array, is set to zero. Using the variable i for all of the arrays allows processing of the psychoacoustic parameter array X(i,Y), the pseudo conforming product data array Xv(i, Z), and the standard deviation array σX(i) described below temporally aligned.

Next, in Step S107, the standard deviation σX(i) is calculated for Y of the data of the psychoacoustic parameter array X(i,Y) ($0 \leq i \leq n-1$, and $1 = Y \leq P$) obtained from the number P of the conforming product samples 8. It is to be noted that the standard deviation is not against the time-series array i but against the number P of the conforming product samples because the standard deviation is calculated for each time-series point of the psychoacoustic parameter.

Next, in Step S108, a variable q, which is used for counting the number of generated pseudo conforming product data items, is set to one.

Next, in Step S109, one number Y is randomly selected from among the sample numbers Y ($1 \leq Y \leq P$) set for the data items obtained from the number P of the conforming product samples. In the process of increasing the number of conforming product data items, random selection of a sample number Y is made in Step S109 for times. Any one of the sample numbers Y is selected with an equal probability, and any one of them may be selected twice or more. For example, even when a number Y selected in the first random selection is 18, a number Y selected in the second random selection or later may be 18 again. Such random selection in Step S109 may be made using a random function provided by a programming language or a piece of hardware such as a random number generator.

Next, in Step S110, a normal random number r(q, L) for loudness is generated. r(q, L) is calculated using the following equation (EQ. 7).

$$r(q,L)=NRnd[\mu=0, \sigma=1]  \quad (EQ. 7)$$

NRnd[μ, σ] is a function which returns normal random numbers at an average value of μ and a standard deviation of σ. A programming language or known algorithm provides a function equivalent to NRnd[μ, σ]. The (EQ. 7) means that a normal random number is obtained from numbers normally distributed at an average of zero and a standard deviation of one.

Next, in Step S111, pseudo conforming product loudness data Lv(i, q) is calculated. Lv(i, q) is calculated using the following equation (EQ. 8).

$$Lv(i,q)=L(i,Y)+[\lambda L * \sigma L(i) * r(q,L)] \quad (EQ. 8)$$

Then, for noisiness, a normal random number is generated in Step 112 and pseudo conforming product data is calculated in Step 113. For sharpness, a normal random number is generated in Step 114 and pseudo conforming product data is calculated in Step 115. For roughness, a normal random number is generated in Step 116 and pseudo conforming product data is calculated in Step 117. For fluctuation strength, a normal random number is generated in Step 118 and pseudo conforming product data is calculated in Step 119. The generation of normal random numbers and calculation of pseudo conforming product data are performed in the same manner as for loudness in Steps S110 and S111.

Next, in Step S120, q is compared with Q to determine whether or not q is equal to or larger than Q. q smaller than Q indicates that the number of pseudo conforming products for which data has been generated has not reached Q. Then, q is incremented by one in Step S121, and the process returns to Step S109 and repeats the subsequent steps. q equal to or larger than Q indicates that the number of generated pseudo conforming product data items has reached Q. Then, the process proceeds to Step S122.

Next, in Step S122, the variable i is compared with n−1 to determine whether or not i is equal to or larger than n−1. The variable i smaller than n−1 indicates that increasing of the number of pseudo conforming product data items has not been performed for all the time-series points. Then, i is incremented by one in Step S123, and the process returns to Step S107 and repeats the subsequent steps. The variable i equal to or larger than n+1 indicates that increasing of the number of pseudo conforming product data items has been performed for all the time-series points. Then, the process proceeds to Step S124, where the process of increasing of the number of pseudo conforming product data items ends.

The increasing of the number of pseudo conforming product data items simulatively provides the number Q of pseudo conforming product samples even when the number of the conforming product samples 8 actually prepared is P. Thus, for example, when the number P of the conforming product samples is 20 and the number Q of the pseudo conforming product samples is 280, the next Step S11 is performed as if there were data of 300 conforming products.

FIG. 21, FIG. 22, FIG. 23, and FIG. 24 are diagrams respectively showing frequency distribution of values of loudness, sharpness, roughness, and fluctuation strength of sound waveform data items obtained at the same time-series points for industrial products serving as subject workpieces 1. In each of the diagrams, the upper histogram is based on sound waveform data of 353 subject workpieces 1. The lower histogram is based on data of the first to twentieth one of the subject workpieces 1 in the order of data obtainment for the upper histogram and pseudo conforming product data of 333 subject workpieces 1 obtained by increasing of the number of pseudo conforming product data items using the data of the subject workpieces 1 as data obtained from the conforming product sample set 9. Here, the number of conforming product samples P is 20, the sample increase number Q is 333, and the random-noise coefficient λX is 0.5 Referring to the diagrams, even though the standard deviation is slightly larger than that of the set of the actual samples, the set including the pseudo conforming product data items is similar to the set of data items obtained from the actual samples in aspects including distribution.

Figure 11:
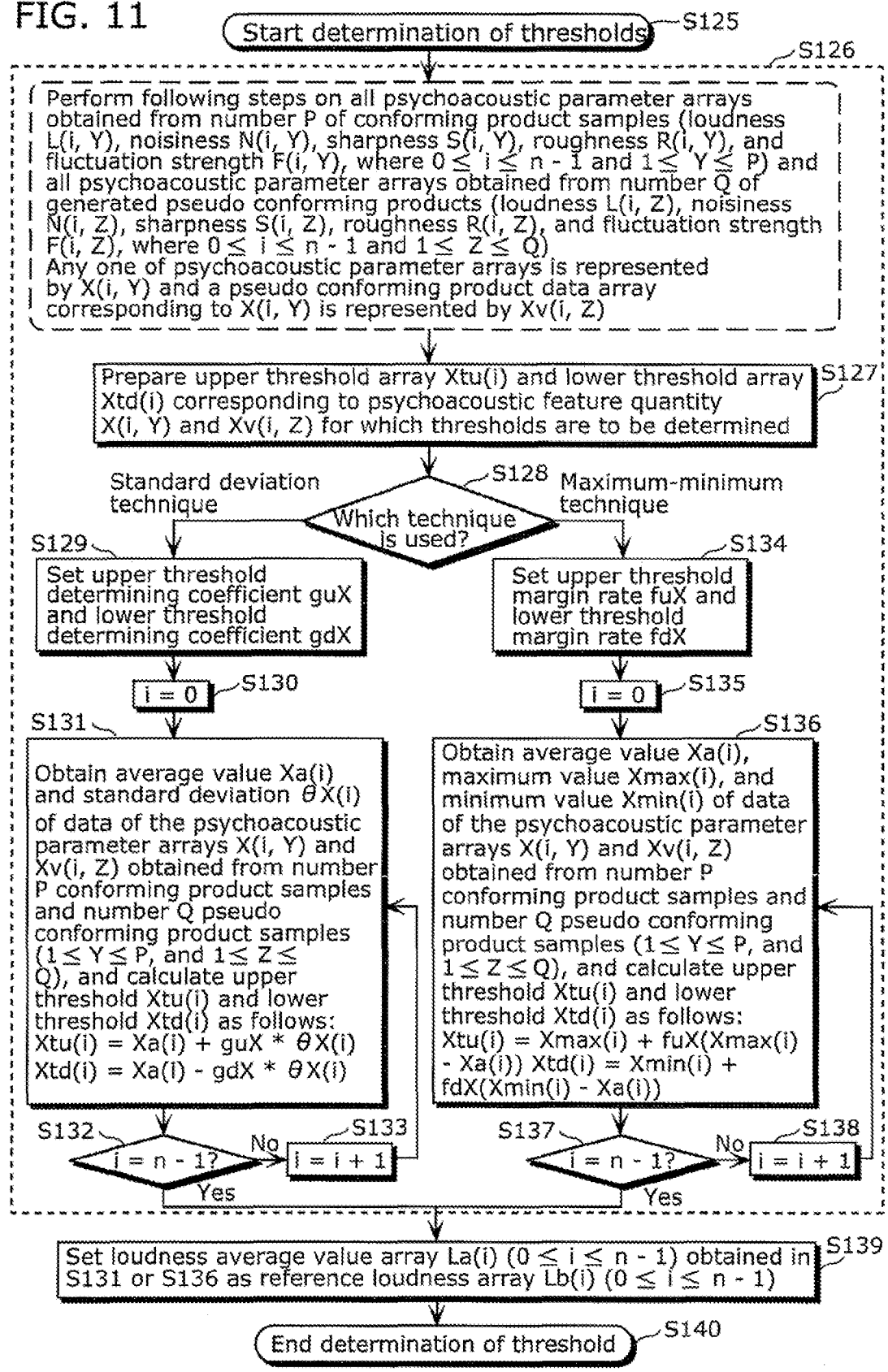
FIG. 11 shows a flowchart illustrating a process of determination of thresholds.

The following describes the process of determination of thresholds in Step S11. FIG. 11 shows a flowchart illustrating details of the process of increasing of the number of conforming-product data items in Step S11. The determination of thresholds is performed on each of the psychoacoustic parameter arrays obtained from the number P of conforming product samples and time-offset in Step S9 (loudness L(i, Y), noisiness N(i, Y), sharpness S(i, Y), roughness R(i, Y), and fluctuation strength F(i, Y), where 0≤i≤n−1, and 1≤Y≤P), and on each of the psychoacoustic parameter arrays of the data obtained from the number Q of pseudo conforming product samples in Step S10 (loudness Lv(i, Z), noisiness Nv(i, Z), sharpness Sv(i, Z), roughness Rv(i, Z), and fluctuation strength Fv(i, Z), where 0≤i≤n−1, and 1≤Z≤Q). It is to be noted that, in FIG. 11, the process is not described not for each of the psychoacoustic parameters, and any one of the psychoacoustic parameter arrays is represented by X(i, Y) or Xv(i, Z). In the same manner, an upper threshold array, a lower threshold array, an average value, a maximum value, a standard deviation, an upper threshold determining coefficient, a lower threshold determining coefficient, an upper threshold margin rate, and a lower threshold margin rate of the psychoacoustic parameters in the following description are represented by Xtu(i), Xtd(i), Xa(i), Xmax(i), Xmin(i), θX(i), guX, gdX, fuX, and fdX, respectively, and the letter X in these array names is to be read as follows depending on the psychoacoustic parameters: L for loudness, N for noisiness, S for sharpness, R for roughness, and F for fluctuation strength. That is, Step S126 is performed on each of the five psychoacoustic parameters.

In Step S125, the process of determination of thresholds is started, and then above mentioned Step S126 is performed. Next, in Step S127, an upper threshold array Xtu(i) and a lower threshold array Xtd(i) are prepared for the psychoacoustic parameter arrays X(i, Y) and Xv(i, Z), respectively, for which thresholds are to be determined.

Next, in Step S128, a method of determination of thresholds is selected from a standard deviation technique or a maximum-minimum technique. When the standard deviation technique is selected, the process proceeds to Step S129. When the maximum-minimum technique is selected, the process proceeds to Step S134. The following separately describes each of these techniques.

The process using the standard deviation technique is performed using the following steps.

First, in Step S129, an upper threshold determining coefficient guX and a lower threshold determining coefficient gdX are set to a value. guX and gdx are usually set to the same value, but may be set to different values in order to set different criteria for an upper threshold and a lower threshold. For example, when a determination as to whether or not values of the psychoacoustic parameters matches a condition is to be made only based on an upper threshold, the lower threshold determining coefficient gdx of a large value, for example, 20 is convenient because the lower threshold is thus set to a level low enough to be ignorable. In the case where conforming product data items and pseudo conforming product sample data items are normally distributed, approximately 99.8% of the conforming products are within a range between thresholds when guX=gdX=3. However, it is practically rare for data items of conforming products to be normally distributed. The setting that guX=gdX=3 is thus likely to cause overdetection in actual quality evaluation based on non-stationary sound. A practical setting to produce a preferable result is that guX and gdX are between approximately 4 and 6.

Next, in Step S130, the variable i, which specifies a time-series position in each of the arrays as an index of the array, is set to zero.

Next, in Step S131, an average value Xa(i) and a standard deviation θX(i) are calculated from the data of the psychoacoustic parameter arrays X(i, Y) and Xv(i, Z) of the number P+Q of the conforming product samples (1≤Y≤P, and 1≤Z≤Q), and then an upper threshold Xtu(i) and a lower threshold Xtd(i) are calculated. Xtu(i) and Xtd(i) are calculated using the following equations (EQ. 9) and (EQ. 10), respectively.

$$Xtu(i)=Xa(i)+guX*\theta X(i) \qquad (EQ. 9)$$

$$Xtd(i)=Xa(i)-gdX*\theta X(i) \qquad (EQ. 10)$$

Next, in Step S132, the variable i is compared with n−1 to determine whether or not the variable i is equal to n−1 or larger. The variable i smaller than n−1 indicates that determination of thresholds has not been made for all the time-series points. Then, i is incremented by one in Step S133, and the process returns to Step S131 and repeats the subsequent steps. The variable i equal to or larger than n+1 indicates that determination of thresholds has been made for all the time-series points. Then, the process proceeds to Step S139.

The process using the minimum-maximum technique is performed using the following steps.

First, in Step S134, an upper threshold margin rate fuX and a lower threshold margin rate fdX are set. fuX and fdx are usually set to the same value, but may be set to different values in order to set different criteria for an upper threshold and a lower threshold. For example, when a determination as to whether or not values of the psychoacoustic parameters matches a condition is to be made only based on an upper threshold, the lower threshold margin rate fdx of a large value, for example, 5 is convenient because the lower threshold is thus set to a level low enough to be ignorable. Specific functions of fux and fdX are detailed later.

Next, in Step S135, the variable i, which specifies a time-series position in each of the arrays as an index of the array, is set to zero.

Next, in Step S136, an average value Xa(i), a maximum value Xmax(i), and a minimum value Xmin(i) are calculated from the data of the psychoacoustic parameter arrays X(i, Y) and Xv(i, Z) of the number P+Q of the conforming product samples (1≤Y≤P, and 1≤Z≤Q), and then an upper threshold Xtu(i) and a lower threshold Xtd(i) are calculated. Xtu(i) and Xtd(i) are calculated using the following equations (EQ. 11) and (EQ. 12), respectively.

$$Xtu(i)=Xmax(i)+fuX[Xmax(i)-Xa(i)] \qquad (EQ. 11)$$

$$Xtd(i)=Xmin(i)+fdX[Xmin(i)-Xa(i)] \qquad (EQ. 12)$$

As indicated by (EQ. 11), an upper threshold is determined by adding the maximum value Xmax(i) and a product of fuX and a difference between the maximum value Xmax(i) and the average value Xa(i) of the conforming product data and pseudo conforming product sample data. Similarly, as indicated by (EQ. 12), an lower threshold is determined by adding the minimum value Xmin(i) and a product of fdX and a difference between the minimum value Xmin(i) and the average value Xa(i) of the conforming product data and pseudo conforming product sample data. For example, in the case where, loudness at a time-series point has an average value of 2, a maximum value of 4, and a minimum value of 0.8, and fux is set to 0.05 and fdx is set to 0.1, an upper threshold Xtu(i) is 4.1, which is the result obtained by subtracting the average value from the maximum value to obtain a difference of 2, multiplying the difference of 2 by 0.05 to obtain a product of 0.1, and adding the product of 0.1 to the maximum value to obtain a sum of 4.1. In the same case, a lower threshold Xtd(i) is 0.68, which is the result obtained by subtracting the average value from the minimum value to obtain a difference of −1.2, multiplying the difference of −1.2 by 0.1 to obtain a product of −0.12, and adding the product of −0.12 to the minimum value to obtain a sum of 0.68. When both fuX and fdX are set to zero, the maximum value and the minimum value of the conforming product data items or the pseudo conforming product sample data items are an upper threshold and a lower threshold, respectively. However, the setting that fuX=fdX=0 is likely to cause overdetection in actual quality evaluation based on non-stationary sound. A practical setting to produce a preferable result is that fuX and fdX are between approximately 0.05 and 0.2.

Next, in Step S137, the variable i is compared with n−1 to determine whether or not the variable i is equal to n−1 or larger. The variable i smaller than n−1 indicates that determination of thresholds has not been made for all the time-series points. Then, i is incremented by one in Step S138, and the process returns to Step S136 and repeats the subsequent steps. The variable i equal to or larger than n+1 indicates that determination of thresholds has been made for all the time-series points. Then, the process proceeds to Step S139.

Just before the process proceeds to Step S139, upper threshold arrays Xtu(i) and lower threshold arrays Xtd(i) have been determined for all the psychoacoustic parameters over all the time-series points.

Next, in Step S139, a loudness average value array La(i) (0≤i≤n−1), which is obtained in Step S131 or Step S136, is set as a reference loudness array Lb(i) (0≤i≤n−1). Then, the process of determination of thresholds ends in Step S140.

Figure 12:
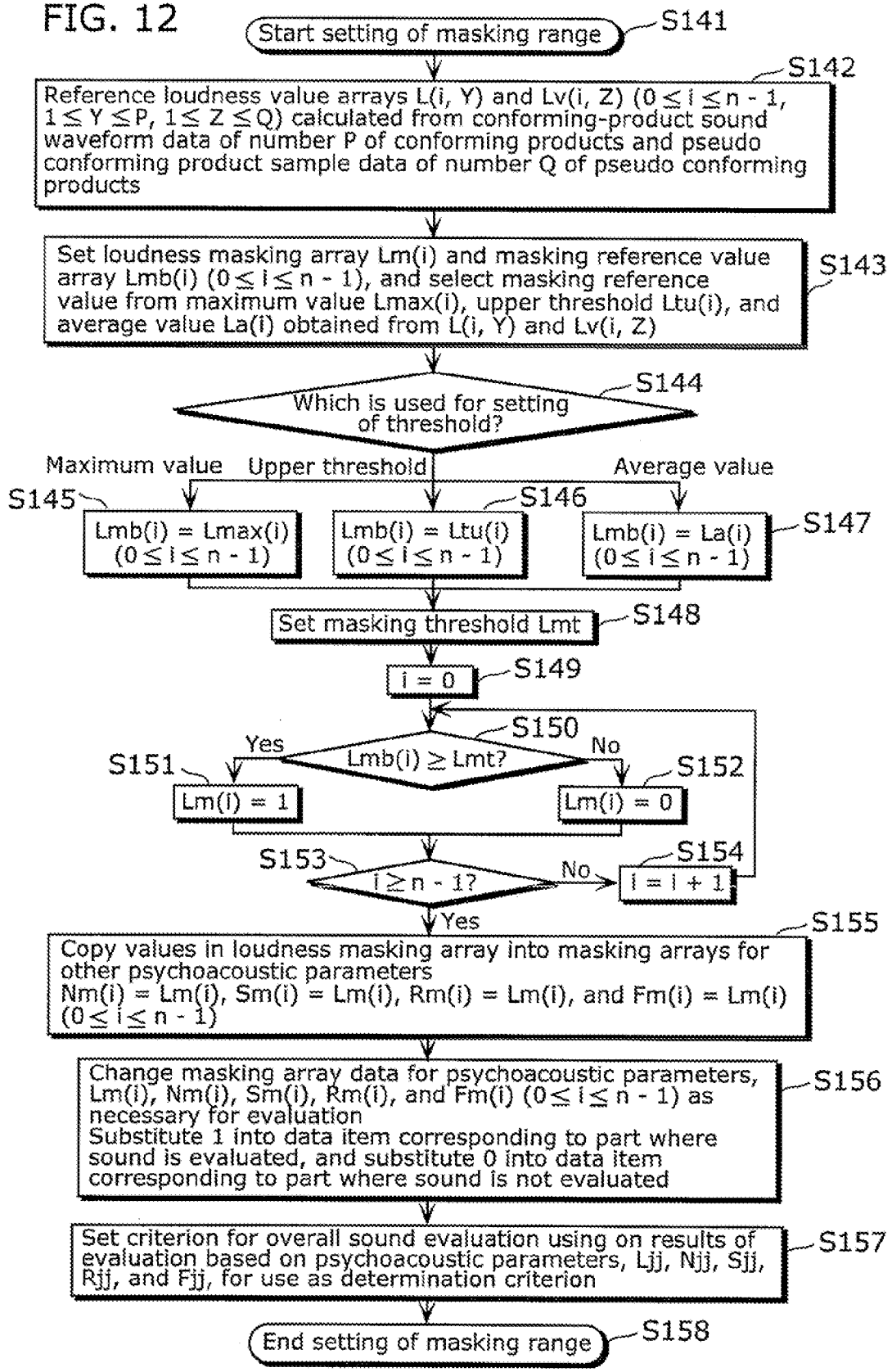
FIG. 12 shows a flowchart illustrating a process of setting of a masking range.

The following describes the process of setting of a masking range in Step S12. FIG. 12 shows a flowchart illustrating details of the process of setting of a masking range in Step S12.

In Step S141, the process of setting of a masking range is started. Next, in Step S142, loudness value arrays L(i, Y) and Lv(i, Z) (0≤i≤n−1, 1≤Y≤P, 1≤Z≤Q), which have been calculated from the sound waveform data obtained from the number P+Q of the conforming products and pseudo conforming product samples are referenced.

Next, in Step S143, a loudness masking array Lm(i) and a masking reference value array Lmb(i) (0≤i≤n−1) are set, and a determination is made as to which of a maximum value Lmax(i), an upper threshold Ltu(i), and an average value La(i) obtained from L(i, Y) and Lv(i, Z) is used as a masking reference value.

Next, in Step S144, a subsequent step is determined depending on the method of determining thresholds determined in Step S143. When the maximum value is determined to be used as the masking reference value, the process proceeds to Step S145. When the upper threshold is determined to be used as the masking reference value, the process proceeds to Step S146. When the average value is determined to be used as the masking reference value, the process proceeds to Step S147.

In Step S145, the maximum value Lmax(i) (0≤i≤n−1) is calculated from the loudness value array L(i, Y), Lv(i, Z) (1≤Y≤P, and 1≤Z≤Q), and the maximum value Lmax(i) is substituted into the masking reference value array Lmb(i) (0≤i≤n−1).

In Step S146, the upper threshold of loudness obtained in Step S11, Ltu(i) (0≤i≤n−1) is substituted into the masking reference value array Lmb(i) (0≤i≤n−1).

In Step S147, the average value La(i) (0≤i≤n−1) is calculated from the loudness value array L(i, Y), Lv(i, Z) (1≤Y≤P, and 1≤Z≤Q), and the average value La(i) is substituted into the masking reference value array Lmb(i) (0≤i≤n−1).

Figure 20:
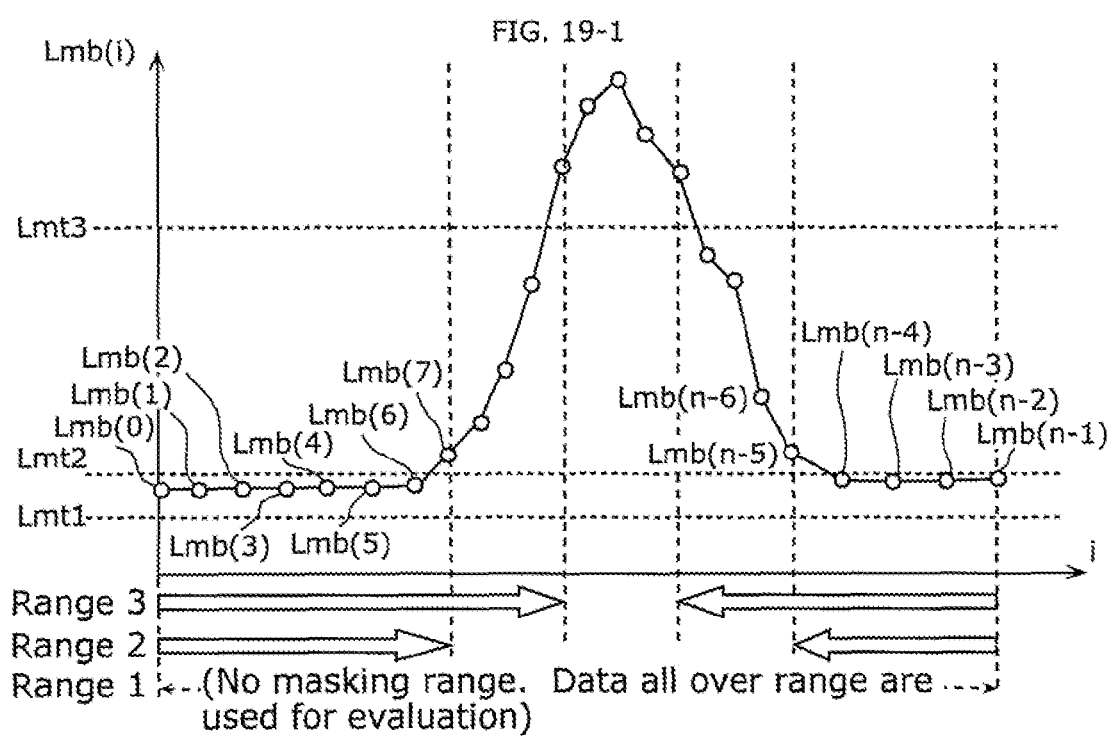
FIG. 20 shows a relationship between a masking threshold Lmt and a masking reference value array Lmb(i), and a change of a masking range for different values of Lmt.
Figure 21:
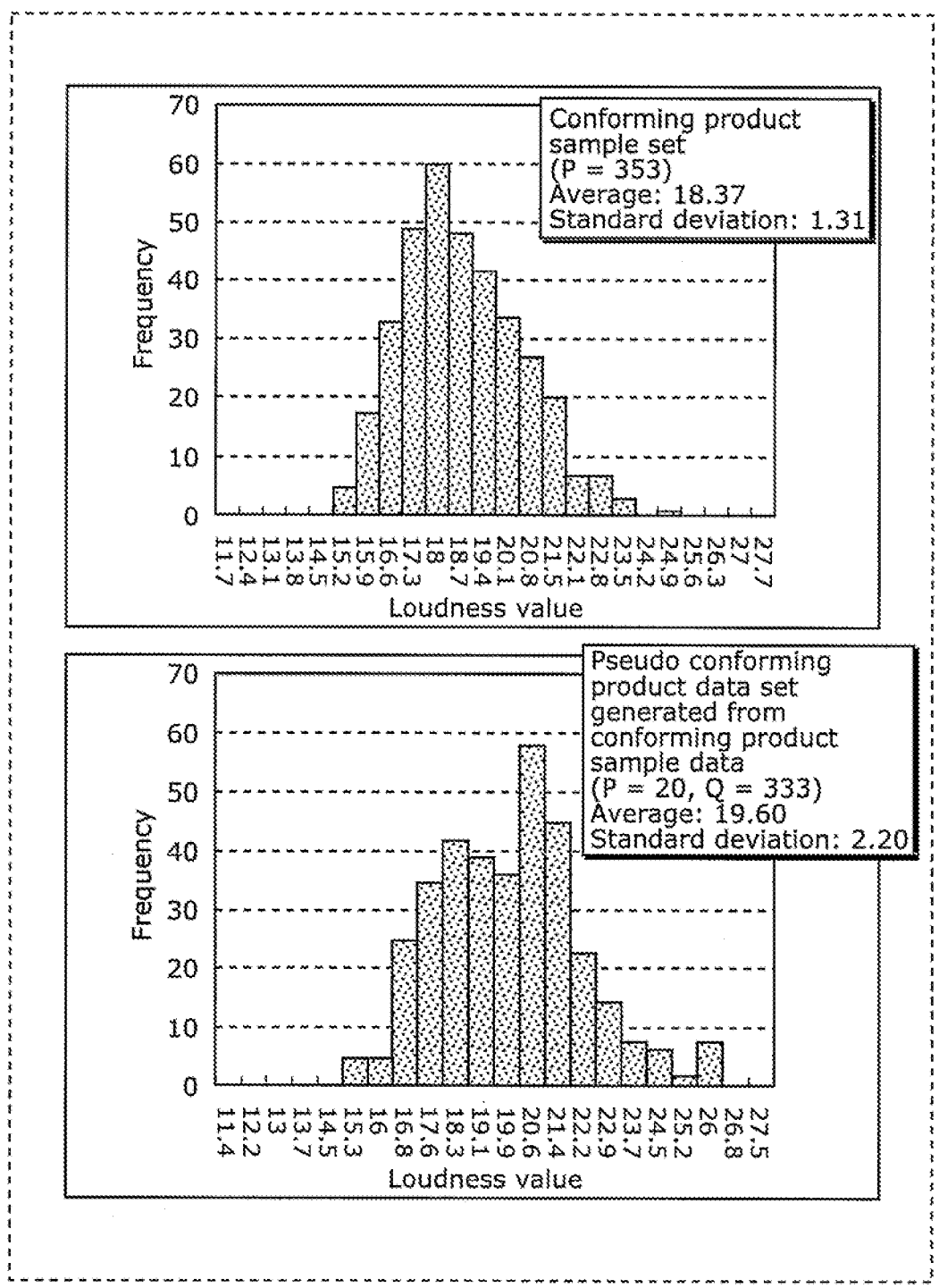
FIG. 21 shows a comparison of a histogram based on data of loudness values of actual conforming product sample set and a histogram based on data of loudness values of obtained through the process of increasing of the number of conforming-product data items.
Figure 22:
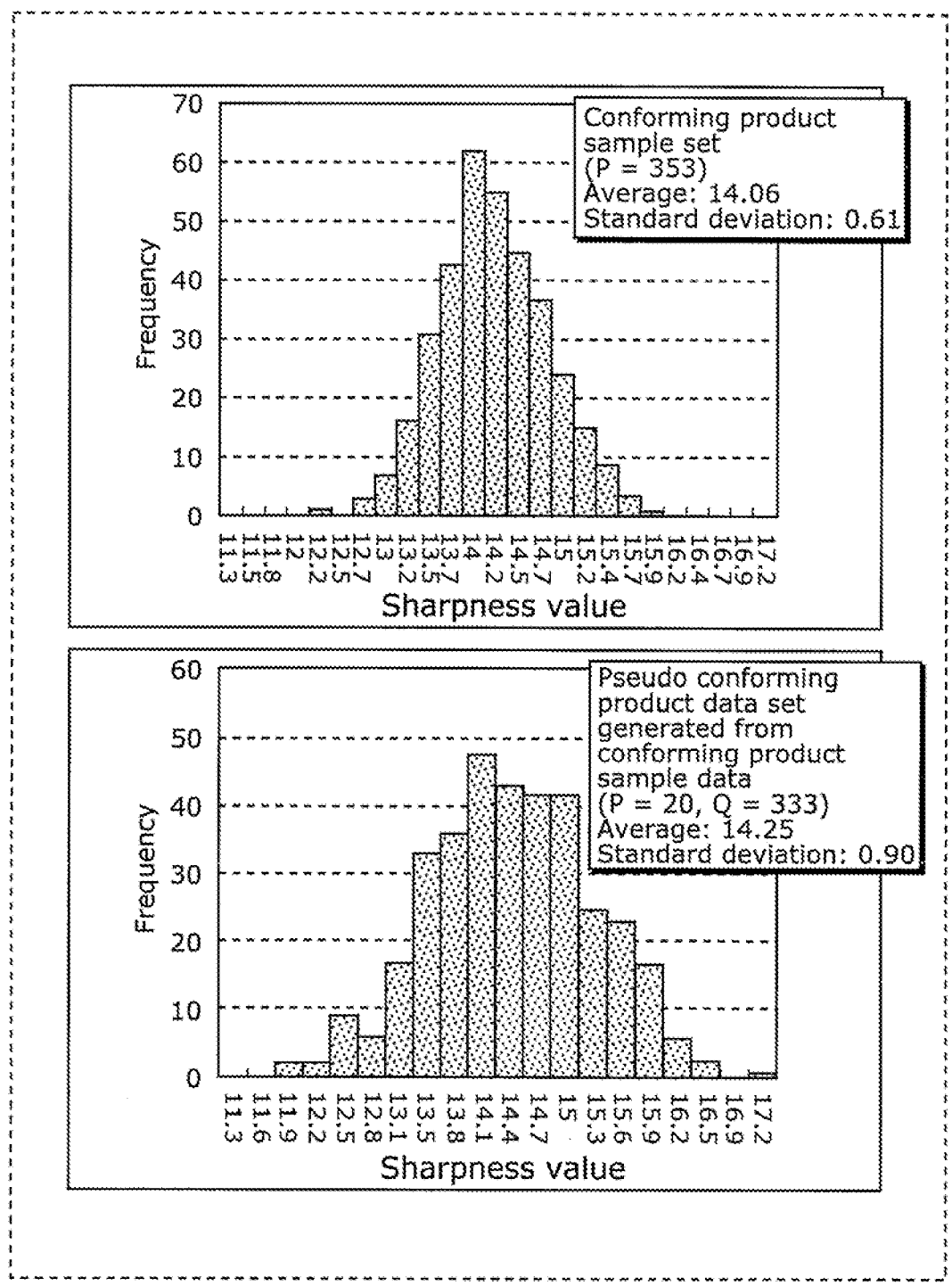
FIG. 22 shows a comparison of a histogram based on data of sharpness values of actual conforming product sample set and a histogram based on data of loudness values of obtained through the process of increasing of the number of conforming-product data items.
Figure 23:
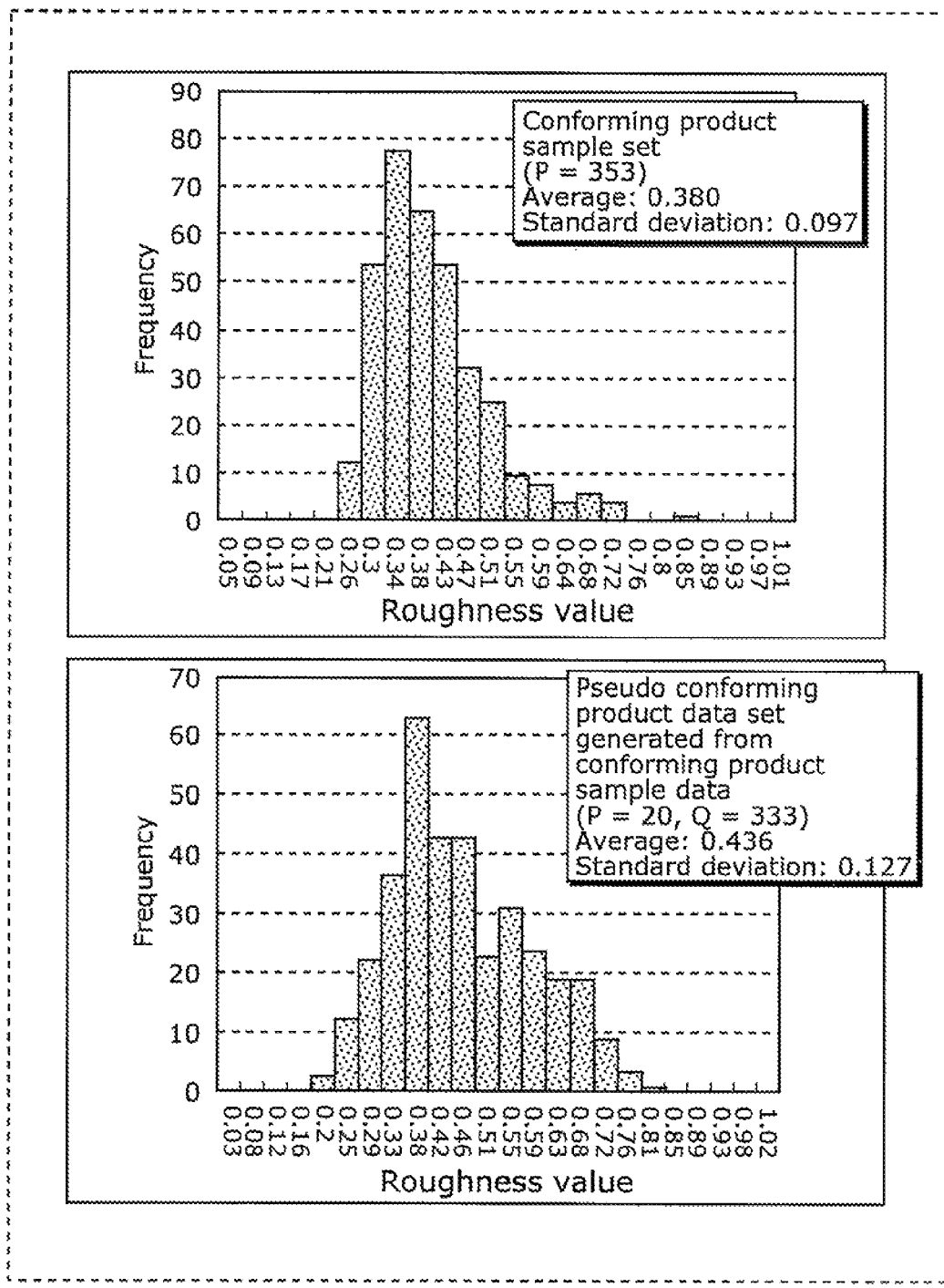
FIG. 23 shows a comparison of a histogram based on data of roughness values of actual conforming product sample set and a histogram based on data of loudness values of obtained through the process of increasing of the number of conforming-product data items.
Figure 24:
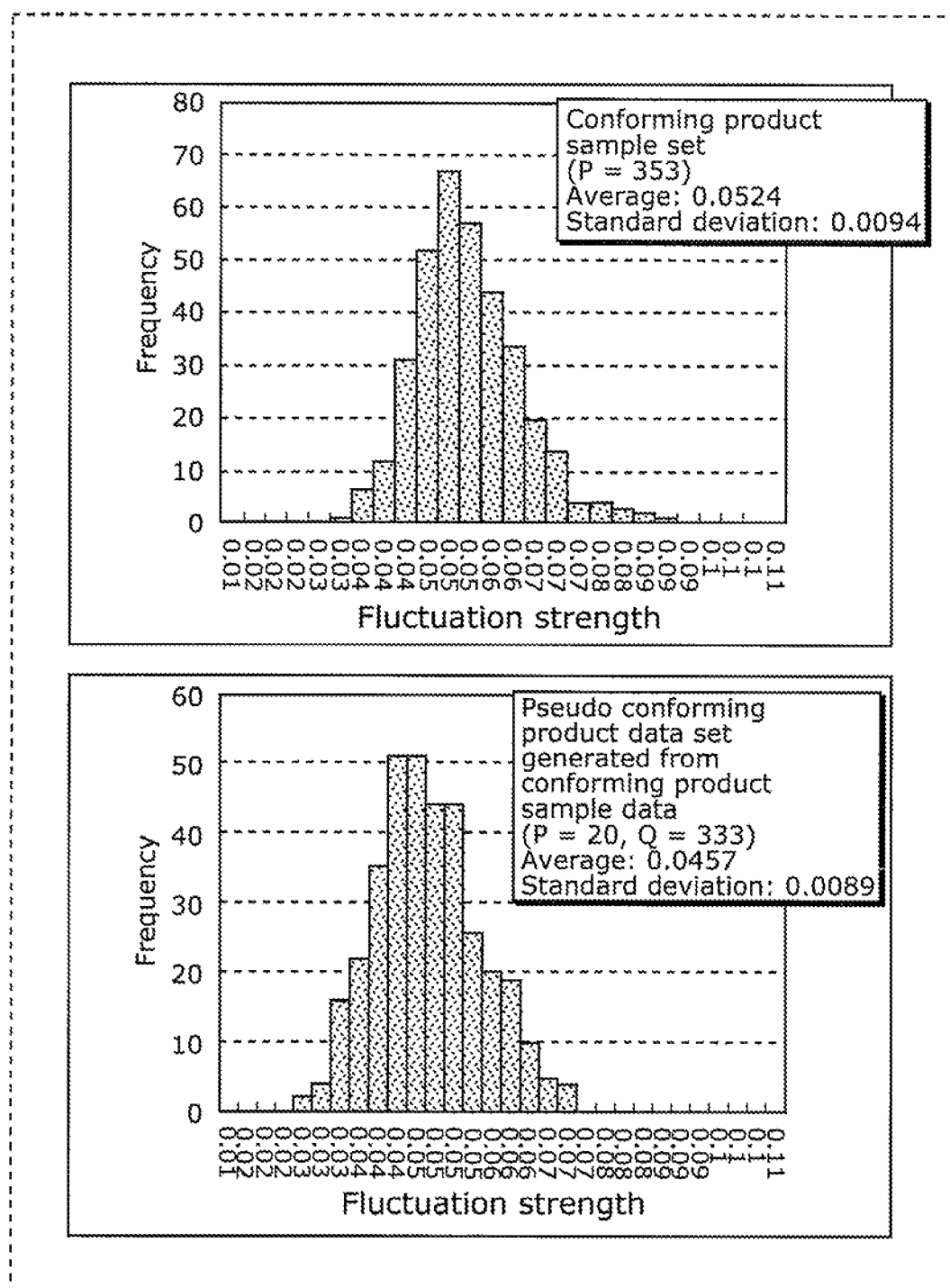
FIG. 24 shows a comparison of a histogram based on data of fluctuation strength values of actual conforming product sample set and a histogram based on data of loudness values of obtained through the process of increasing of the number of conforming-product data items.
Figure 25:
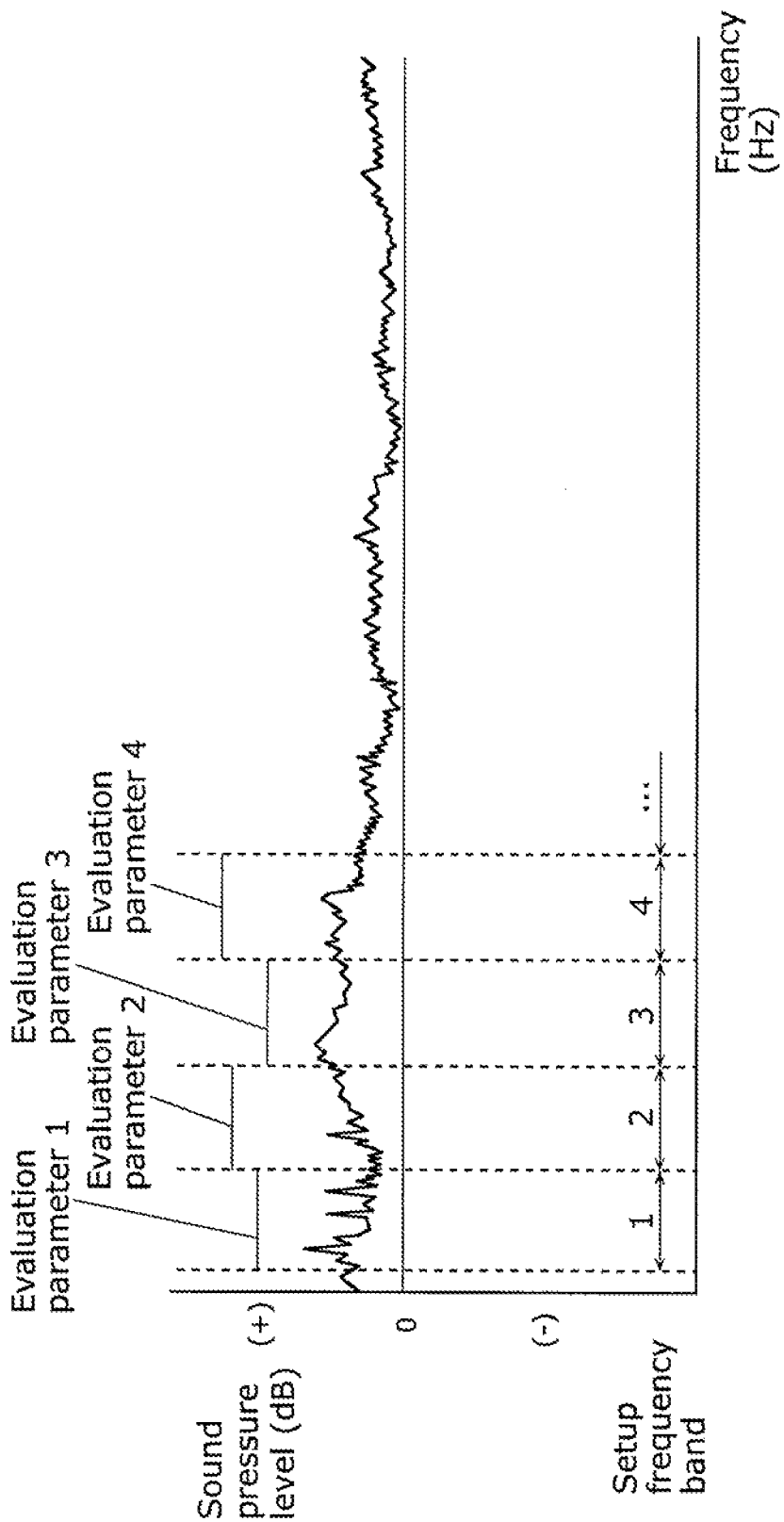
FIG. 25 illustrates a conventional quality evaluation method disclosed in Patent Reference 1.

Next, in Step S148, a masking threshold Lmt is set. The masking threshold Lmt is determined by comparison with the masking reference value array Lmb(i) set in Steps S145, S146, and S147 above. FIG. 20 shows an example of Lmb(i) and an exemplary settings of Lmt. Even though there is a slight difference between Step S145, S146, and S147, Lmb(i) is a loudness value and represents the magnitude of sound volume.

Referring to FIG. 20, the loudness curve is close to the lower end and flat in the range from Lmb(0) to Lmb(6) and the range from Lmb(n−4) to Lmb(n−1). These ranges may be considered as a silent part, in which the subject workpiece emits no operation sound. On the other hand, the range from Lmb(7) to Lmb(n−5) may be considered as a non-silent part, in which the subject workpiece emits an operation sound. The quality evaluation method is effective as long as it allows quality evaluation based on operation sound emitted from industrial products. The evaluation may be therefore more reliable with less overdetection of abnormalities in the silent part when evaluation is made only for the non-silent part where an operation sound is emitted than when evaluation is made for all over the waveform obtained in the obtainment of sound waveform data. Because of this, the masking is performed in order to mask data in such an unnecessary silent part of a waveform obtained in the process of obtainment of sound waveform data. In Embodiment 1, a masking range is set for masking of a time-series part in which Lmb(i) is below Lmt. When Lmt3 shown in FIG. 20 is set as a masking threshold, the masking range is Range 3. Similarly, when Lmt 2 is set as a masking threshold, the masking range is Range 2. When Lmt1 is set as a masking threshold, evaluation is made for the whole time-series range of 0≤i≤n−1 because there is no range in which Lmb(i) is below Lmt.

From this consideration, setting Lmt2 as a masking threshold is preferable for appropriate evaluation of only the operation sound emitted from the subject workpiece 1 in the example shown in FIG. 20. In a possible practical setting, the computer 5 will be provided with a function which allows a worker to set a masking threshold with reference to a graph or a diagram showing a relationship between obtained Lmb(i) and Lmt to be set as in the example shown in FIG. 20.

Next, in Step S149, the variable i, which specifies a time-series position in each of the arrays as an index of the array, is set to zero.

Next, in Step S150, Lbm(i) is compared with Lmt to determine whether or not Lbm(i) is equal to or larger than Lmt. When Lbm(i) is equal to or larger than Lmt, the process proceeds to Step S151, and one is substituted into the loudness masking array Lm(i). When Lbm(i) is smaller than Lmt, the process proceeds to Step S152, and zero is substituted into the loudness masking array Lm(i). These operations mean that a time-series point at which one is substituted into the masking array is used for evaluation and that a time-series point at which zero is substituted into the masking array is not used for evaluation.

Next, in Step S153, the variable i is compared with n−1 to determine whether or not the variable i is equal to n−1 or larger. The variable i smaller than n−1 indicates that setting of a masking range has not been made for all the time-series points. Then, i is incremented by one in Step S154, and the process returns to Step S150 and repeats the subsequent steps. The variable i equal to or larger than n+1 indicates that setting of a masking range has been made for all the time-series points. Then, the process proceeds to Step S155.

Next, in Step S155, the values thus set in the loudness masking array $Lm(i)$ ($0 \leq i \leq n-1$) are copied into the masking array $Xm(i)$ ($0 \leq i \leq n-1$) for each of the psychoacoustic parameters other than the loudness. The operation in Step S155 is performed in order to use the loudness masking array also for the masking arrays for the other psychoacoustic parameters.

Next, in Step S156, the data of the masking arrays for the psychoacoustic parameters, $Lm(i)$, $Nm(i)$, $Sm(i)$, $Rm(i)$, and $Fm(i)$ ($0 \leq i \leq n-1$) is changed as necessary. In the changing, one is substituted into a data item corresponding to a part for which evaluation is to be made, and zero is substituted into a data item corresponding to a part for which evaluation is not to be made. Usually, the loudness masking array $Lm(i)$ ($0 \leq i \leq n-1$), set in Steps S142 to Step S154, may be used for the masking arrays for all the psychoacoustic parameters without any problem, as set in Step S155. However, it is also possible to change the masking array for the psychoacoustic parameter $Xm(i)$ depending on evaluation conditions or necessity for minor modifications. It is needless to say that this step may be skipped when no change or modification is necessary.

Next, in Step S157, combination logic of evaluation values of Ljj, Njj, Sjj, Rjj, and Fjj of the respective psychoacoustic parameters described for Step S70 of Step S5 is set in order to make an overall determination of sound abnormality. As shown in the description of Step S70, although one is substituted into the evaluation value when there is an abnormality in the psychoacoustic parameter, and zero when there is not. However, because a sound is usually determined to be an abnormal sound in an overall determination when at least one evaluation value indicates abnormality, (EQ. 4) is used as a criterion formula for overall determination of conforming products, giving combination logic. Combination logic is not limited to an equation such as (EQ. 4) but may be a combination of the evaluation values and Boolean operators such as AND, OR, and XOR, or a combination of a control structure of conditional branches such as a code written in a programming language. Then, the process of setting of a masking range ends in Step S158.

Although psychoacoustic parameters are used for digitalization of non-stationary sound of operation sound of subject workpiece in Embodiment 1, usual sound pressure levels may be also used instead. However, using sound pressure levels does not allow digitalization of tones, non-stationary sound is evaluated on the basis of noise levels measured in a conventional way.

Although the psychoacoustic parameters are calculated while obtaining sound data on site from the subject workpiece 1 in Step S1 and conforming product sample sets 9 in Step S8 in Embodiment 1, Step S1 or Step S8 may be performed using sound waveform data obtained using a method such as digital recording in advance.

The average value of the amount of psychoacoustic characteristics usually used in Embodiment 1 is an arithmetic average, other average values such as a geometric average, a harmonic average or a median value may be used instead.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The quality evaluation method according to the present invention allows tonal evaluation of noise changing with time and determination of thresholds for evaluation even when few defective products which emit abnormal sound are available, and thus providing a quality evaluation based on non-stationary sound and close to evaluation by use of a human sense of hearing. The present invention is therefore applicable to a real-time in-line noise test in assembly lines of various industrial products which needs operation sound evaluation.

What is claimed is:

1. A quality evaluation method, comprising:
   obtaining operation sound of conforming product samples as conforming-product sound information, the conforming product samples being products of the same kind as a subject workpiece to be evaluated for quality;
   digitizing the conforming-product sound information of the conforming product samples to obtain conforming-product sound evaluation amounts on a time-series basis, using at least one psychoacoustic parameter;
   determining an evaluation threshold preset in an apparatus using sound evaluation amounts each obtained by adding a result of a multiplication of a standard deviation of a corresponding one of the conforming-product sound evaluation amounts, a random coefficient λX, and a normal random number to one conforming-product sound evaluation amount randomly selected from among the conforming-product sound evaluation amounts, the random coefficient λX being equal to or larger than 0, the normal random number being distributed at an average of 0 and a standard deviation of 1, and the selected one conforming-product sound evaluation amount being allowed to be repeatedly selected;
   obtaining operation sound emitted from the subject workpiece as subject sound information;
   digitizing the subject sound information of the subject workpiece to obtain a subject sound evaluation amount on a time-series basis; and
   evaluating quality of the subject workpiece based on a result of comparison of the subject sound evaluation amount of the subject workpiece with the determined evaluation threshold.

2. The quality evaluation method according to claim 1, wherein at least one of loudness, roughness, noisiness, fluctuation strength, and sharpness is used as the at least one psychoacoustic parameter.

3. The quality evaluation method according to claim 1, wherein the evaluation threshold is determined by:
   (i) one sound evaluation amount is selected from among the conforming-product sound evaluation amounts, (ii) for the selected sound evaluation amount, a difference between adjacent values of the conforming-product sound evaluation amount in a time series is obtained for each point on the time series, (iii) for each of all the conforming-product sound evaluation amounts other than the selected sound evaluation amount, a difference between adjacent values of the conforming-product sound evaluation amount in the time series is obtained for each point on the time series, and (iv) a conforming-product cross correlation function of the difference between the adjacent values of the selected conforming-product sound evaluation amount and the difference between the adjacent values of the conforming-product sound evaluation amounts other than the selected sound evaluation amount is obtained;

a time-series array of the values of the conforming-product sound evaluation amount is shifted by a distance in a direction of the time series based on an index indicating an array position at which the conforming-product cross correlation function has a maximum value, the distance being an absolute value of the index, the direction being a forward direction when the index has a positive value, and the direction being a backward direction when the index has a negative value; and a reference waveform is determined by obtaining average values of the conforming-product sound evaluation amounts for all over the time series.

4. The quality evaluation method according to claim 1, wherein the subject workpiece is evaluated for quality based on a result of comparison between the subject sound evaluation amount and the determined evaluation threshold after following operations:

(i) for each of the subject sound evaluation amount and the reference waveform, a difference between adjacent values of the sound evaluation amount in a time series is obtained for each point on the time series, and (ii) a subject cross correlation function of the difference between the adjacent values of the subject sound evaluation amount and the difference between the adjacent values of the reference waveform is obtained; and a time-series array of the values of the subject sound evaluation amount is shifted by a distance in a direction of the time series based on an index indicating an array position at which the subject cross correlation function has a maximum value, the distance being an absolute value of the index, the direction being a forward direction when the index has a positive value, and the direction being a backward direction when the index has a negative value.

5. A quality evaluation apparatus comprising a quality evaluation unit configured to evaluate quality of a subject workpiece using the quality evaluation method according to claim 1.

* * * * *